US012800842B2

(12) United States Patent
Lee et al.

(10) Patent No.: US 12,800,842 B2
(45) Date of Patent: Nov. 17, 2026

(54) OPTICAL FIBER ATTACHMENT DEVICE AND METHOD

(71) Applicant: Genesee Valley Innovations, LLC, Santa Clara, CA (US)

(72) Inventors: Sanggeon Lee, San Ramon, CA (US); Peter Kiesel, Palo Alto, CA (US); Qiushu Chen, San Jose, CA (US); Jacob N. Chamoun, Somerville, MA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 0 days.

(21) Appl. No.: 19/210,322

(22) Filed: May 16, 2025

(65) Prior Publication Data

US 2025/0277940 A1 Sep. 4, 2025

Related U.S. Application Data

(62) Division of application No. 17/409,408, filed on Aug. 23, 2021, now Pat. No. 12,306,443.

(51) Int. Cl.
*B29C 45/14* (2006.01)
*B29C 45/17* (2006.01)
(Continued)

(52) U.S. Cl.
CPC ...... *G02B 6/3648* (2013.01); *B29C 45/14065* (2013.01); *B29C 45/14467* (2013.01);
(Continued)

(58) Field of Classification Search
CPC ........ B29C 45/14065; B29C 45/14467; B29C 45/14549; B29C 45/1742; B29C 45/34;
(Continued)

(56) References Cited

U.S. PATENT DOCUMENTS 2,291,545 A 7/1942 Ganz et al.
2,892,013 A 6/1959 Gomberg
(Continued)

FOREIGN PATENT DOCUMENTS

CN 102636838 A 8/2012
CN 104033457 A 9/2014
(Continued)

OTHER PUBLICATIONS

European Patent Application No. 22165830.5, Extended European Search Report dated Oct. 27, 2022; 9 pages.
(Continued)

*Primary Examiner* — Edmund H Lee
(74) *Attorney, Agent, or Firm* — Mueting Raasch Group

(57) ABSTRACT

An optical fiber mold device has a first portion that includes a base layer having a longitudinal feature configured to receive an optical fiber. At least one second portion is disposed over the base layer. The second portion has a center wall and front and back end walls. The center wall, the front end wall, and the back end wall form a mold cavity. At least one first hole is disposed in the mold cavity and is configured to allow mold material to enter the mold cavity. At least one second hole in the mold cavity is configured to allow air displaced by the mold material to exit the mold cavity.

16 Claims, 28 Drawing Sheets

(51) Int. Cl.

| | |
|---|---|
| ***B29C 45/34*** | (2006.01) |
| ***B29D 11/00*** | (2006.01) |
| ***C03B 37/10*** | (2006.01) |
| ***G01L 1/24*** | (2006.01) |
| ***G02B 6/36*** | (2006.01) |
| *B29K 63/00* | (2006.01) |
| *B29L 11/00* | (2006.01) |

(52) U.S. Cl.
CPC .... *B29C 45/14549* (2013.01); *B29C 45/1742* (2013.01); *B29C 45/34* (2013.01); *B29D 11/00663* (2013.01); *C03B 37/10* (2013.01); *G01L 1/242* (2013.01); *G02B 6/3696* (2013.01); *B29K 2063/00* (2013.01); *B29L 2011/0075* (2013.01)

(58) Field of Classification Search
CPC ........ B29C 45/14336; B29C 45/14409; B29C 45/14565
See application file for complete search history.

(56) References Cited

U.S. PATENT DOCUMENTS

| | | | | |
|---|---|---|---|---|
| 3,871,935 | A * | 3/1975 | Gloge .................. | G02B 6/3801 216/33 |
| 4,131,404 | A * | 12/1978 | Dubost ............. | B29C 45/14549 264/1.25 |
| 4,705,469 | A | 11/1987 | Liebl et al. | |
| 4,822,434 | A | 4/1989 | Sawaki et al. | |
| 5,022,735 | A | 6/1991 | Dahlgren | |
| 5,093,048 | A * | 3/1992 | Kagan ............... | B29C 45/14549 264/1.27 |
| 5,374,821 | A | 12/1994 | Muhs et al. | |
| 6,306,328 | B1 | 10/2001 | Baffert et al. | |
| 6,587,188 | B2 | 7/2003 | Gleine et al. | |
| 6,668,105 | B2 | 12/2003 | Chen et al. | |
| 7,234,881 | B2 | 6/2007 | Koike et al. | |
| 7,315,681 | B2 | 1/2008 | Kewitsch | |
| 7,358,858 | B2 | 4/2008 | Ozawa et al. | |
| 7,856,888 | B2 | 12/2010 | Ferguson | |
| 8,474,742 | B2 | 7/2013 | Smrha | |
| 10,295,749 | B1 | 5/2019 | Janta-Polczynski et al. | |
| 10,838,163 | B2 | 11/2020 | Gronvall | |
| 2002/0150335 | A1 | 10/2002 | Lachance et al. | |
| 2003/0077345 | A1 | 4/2003 | Suzuki et al. | |
| 2003/0113087 | A1 | 6/2003 | Lee et al. | |
| 2009/0162595 | A1 | 6/2009 | Ko et al. | |
| 2016/0299026 | A1 | 10/2016 | De Jong et al. | |
| 2017/0235050 | A1 | 8/2017 | Kurino et al. | |
| 2017/0350732 | A1 | 12/2017 | Mekid | |
| 2019/0062100 | A1 | 2/2019 | Mertesdorf | |
| 2020/0292774 | A1 | 9/2020 | Bradley et al. | |

FOREIGN PATENT DOCUMENTS

| | | | |
|---|---|---|---|
| CN | 104039490 | A | 9/2014 |
| CN | 104596437 | A | 5/2015 |
| CN | 105651319 | A | 6/2016 |
| CN | 206019592 | U | 3/2017 |
| CN | 108508561 | A | 9/2018 |
| CN | 111812785 | A | 10/2020 |
| CN | 112217144 | A | 1/2021 |
| DE | 696 14 586 | T2 | 6/2002 |
| DE | 10111556 | C1 | 6/2002 |
| EP | 1816432 | A1 | 8/2007 |
| EP | 2247971 | A1 | 11/2010 |
| FR | 2630419 | A1 | 10/1989 |
| JP | H11218458 | A | 8/1999 |
| WO | WO 95/30926 | A1 | 11/1995 |
| WO | WO 2005/031401 | A2 | 4/2005 |
| WO | WO 2018/116130 | A1 | 6/2018 |
| WO | WO 2021/054350 | A1 | 3/2021 |

OTHER PUBLICATIONS

European Patent Application No. 22165836.2, Extended European Search Report dated Sep. 5, 2022; 12 pages.

European Patent Application No. 22165800.8, Extended European Search Report dated Aug. 30, 2022; 10 pages.

European Patent Application No. 22189011.4; Office Action issued Jan. 25, 2023.

Friebele et al., "Optical fiber sensors for spacecraft applications," Aug. 9, 1999, *Smart Mater. Struct.*, 8: 813-38.

Loutas et al., "Reliability of strain monitoring of composite structures via the use of optical fiber ribbon tapes for structural health monitoring purposes," Sep. 1, 2015, *Composite Structures*, 134: 762-71.

U.S. Appl. No. 18/138,929; Notice of Allowance issued Jun. 26, 2025; 16 pages.

* cited by examiner

OPTICAL FIBER ATTACHMENT DEVICE AND METHOD

This application is a divisional application of U.S. patent application Ser. No. 17/409,408, filed 23 Aug. 2021, the disclosure of which is incorporated herein by reference in its entirety.

BACKGROUND

Fiber optic (FO) sensors can be used for detecting parameters such as strain, temperature, pressure, current, voltage, chemical composition, and vibration. FO sensors are attractive components because they are thin, lightweight, sensitive, robust to harsh environments, and immune to electromagnetic interference (EMI) and electrostatic discharge. FO sensors can be arranged to simultaneously measure multiple parameters distributed in space with high sensitivity in multiplexed configurations over long optical fiber cables. One example of how this can be achieved is through fiber Bragg grating (FBG) sensors. A FBG sensor is formed by a periodic modulation of the refractive index along a finite length (typically a few mm) of the core of an optical fiber. This pattern reflects a wavelength, called the Bragg wavelength, determined by the periodicity of the refractive index profile. The Bragg wavelength is sensitive to external stimulus (strain and/or temperature, etc.) that changes the periodicity of the grating and/or the index of refraction of the fiber. Thus, FBG sensors rely on the detection of small wavelength changes in response to stimuli of interest. In some implementations, FO sensors can be attached to structures and operated to detect parameters, e.g., strain, temperature, vibration, related to the health of the structures.

SUMMARY

Embodiments described herein involve an optical fiber mold device, comprising a first portion that includes a base layer having a longitudinal feature configured to receive an optical fiber. At least one second portion is disposed over the base layer. The second portion comprises a center wall and front and back end walls. The center wall, the front end wall, and the back end wall forming a mold cavity. At least one first hole is disposed in the mold cavity and is configured to allow mold material to enter the mold cavity. At least one second hole in the mold cavity is configured to allow air displaced by the mold material to exit the mold cavity.

An optical fiber mold device comprises a first portion that includes a base layer having a longitudinal feature configured to receive an optical fiber. Two or more second portions are spaced apart on the base layer. Each second portion comprises a center wall and front and back end walls. The center wall, the front end wall, and the back end wall forming a mold cavity. At least one first hole is disposed in the mold cavity and is configured to allow mold material to enter the mold cavity. At least one second hole is disposed in the mold cavity and is configured to allow air displaced by the mold material to exit the mold cavity. A tunnel portion is disposed between the two second portions. The tunnel portion is configured to contain an at least one optical sensor disposed on the optical fiber.

A method involves positioning an optical fiber in a longitudinal feature of a base layer of a mold device. The mold device comprises a first portion comprising the base layer having the longitudinal feature configured to receive the optical fiber. A second portion disposed on the base layer. The second portion comprises a center wall and front and back end walls. The center wall, the front end wall, and the back end wall forming a mold cavity. At least one first hole is disposed in the mold cavity and is configured to allow mold material to enter the mold cavity. At least one second hole is disposed in the mold cavity and is configured to allow air displaced by the mold material to exit the mold cavity. The method includes placing the mold device and the optical fiber on a structure surface and injecting the mold material into the first hole of the mold device.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Fiber optic (FO) sensors can be deployed on various types of structures, e.g., bridges, roadways, railways, and electrical devices such as transformers, to monitor the structural health of the structures. Embodiments disclosed herein involve devices and methods for attaching FO sensors to structures. Embodiments described herein may be used as protection of FO sensors from the environment. In some embodiments, the disclosed devices facilitate mounting FO sensors to the structures in such a way that strain from the structures is transmitted to the sensors. In some embodiments, the disclosed devices can be used to attach FO sensors to structures in such a way that the sensors are isolated from strain in the structures. The approaches discussed herein provide for attachment of FO sensors that is flexible enough to attach the FO sensors to a variety of different substrates, e.g. concrete, metal, masonry, and wood. The described devices and methods enhance repeatability of the attachment so that the optical fibers may be attached in the same shape and/or length and/or so that at least some or most of the FO sensors have the same pre-strain once attached. The disclosed attachment approaches can be simple and rapid to perform to facilitate the deployment of multiple FO sensors on a structure. The use of an adhesive attachment approach as described below obviates the need to drill holes in the structure or weld to the structure.

Figure 1A:
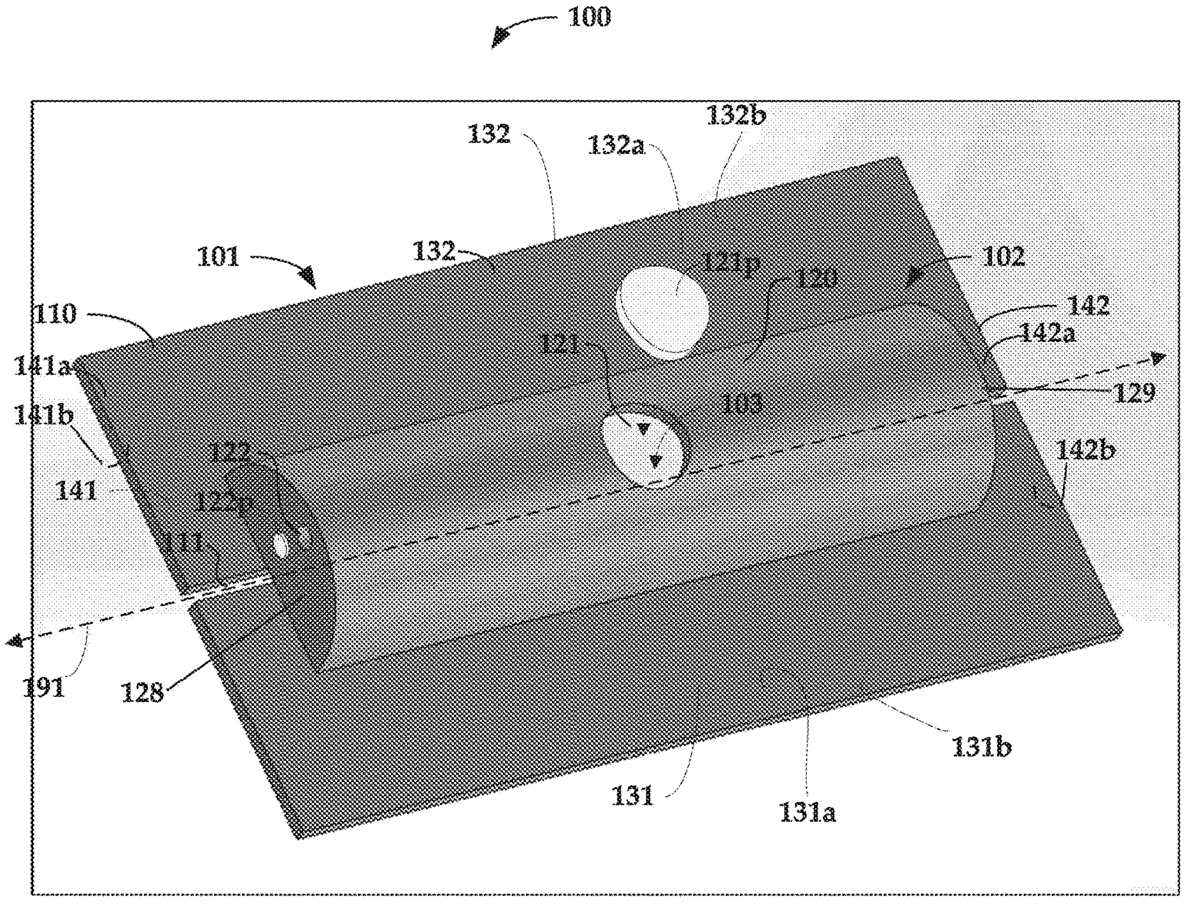
FIG. 1A is a perspective view of a mold device in accordance with some embodiments.
Figure 1B:
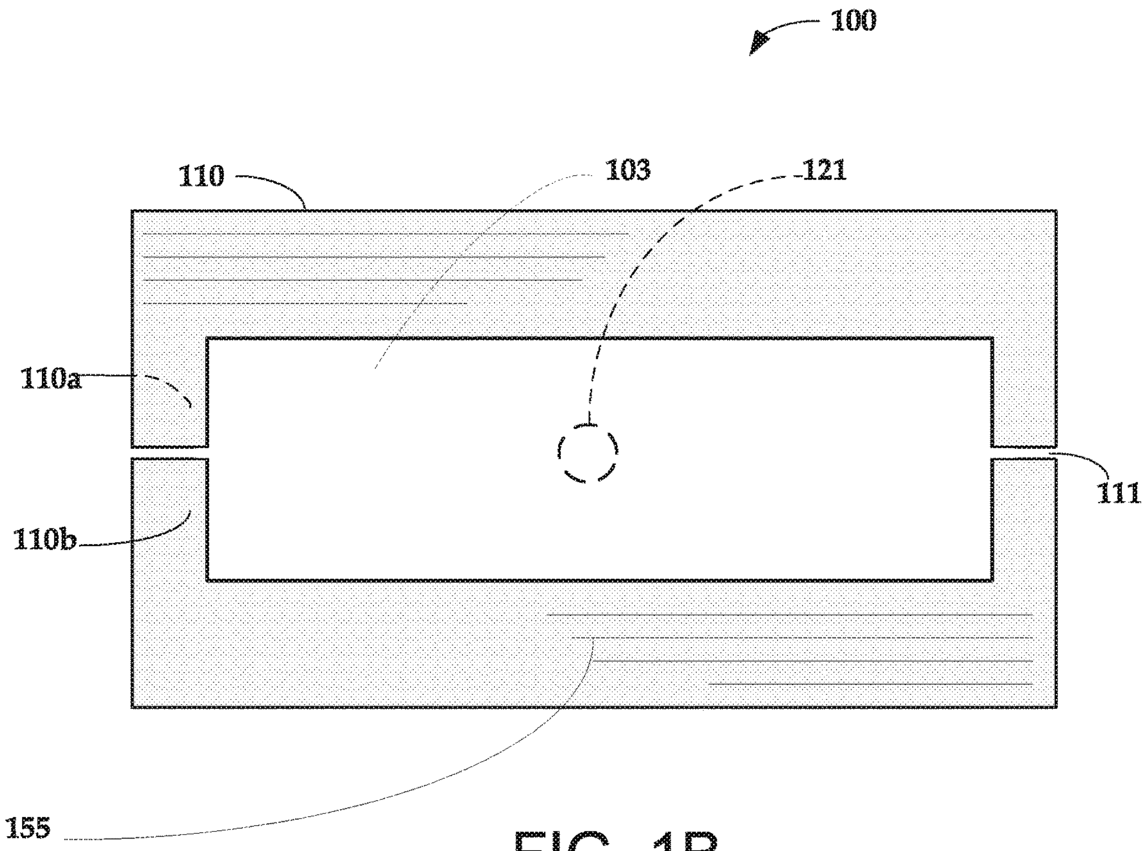
FIG. 1B and 1C are bottom view of the mold device of FIG. 1A.
Figure 1C:
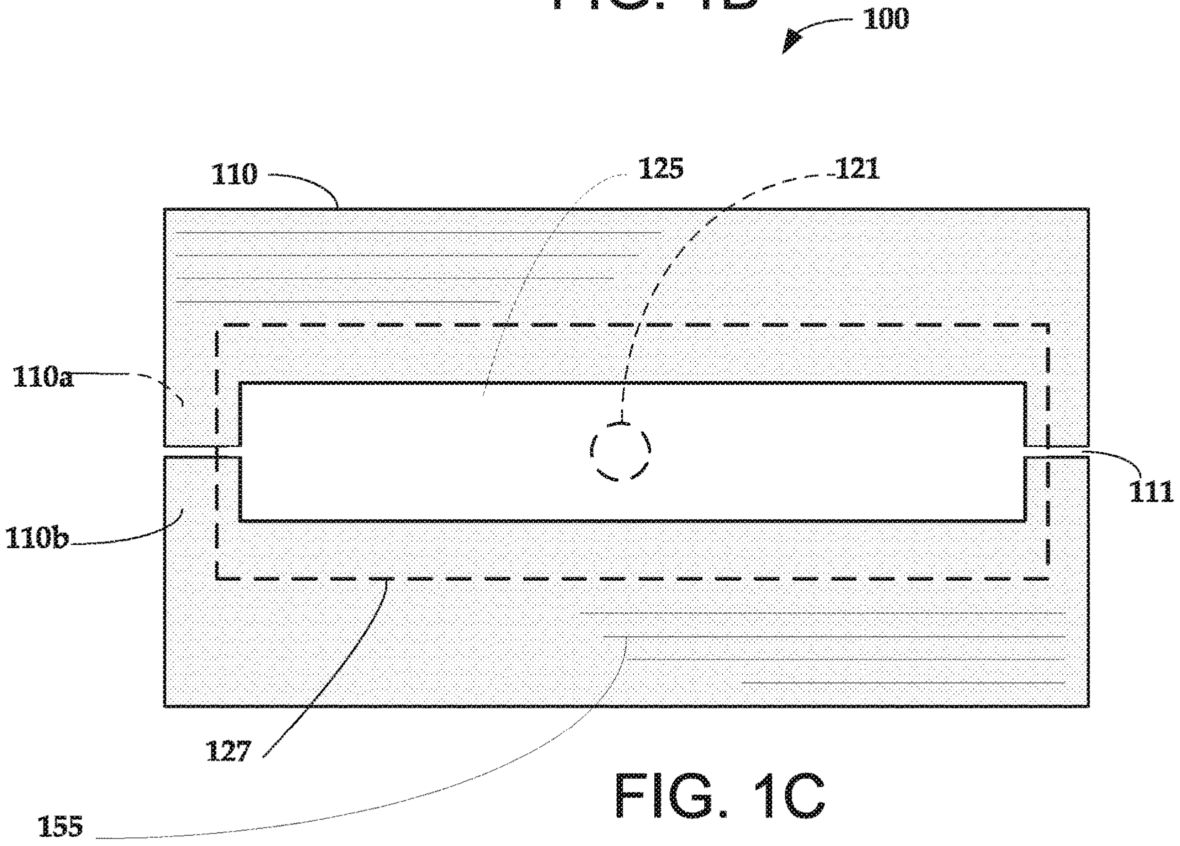
Figure 1D:
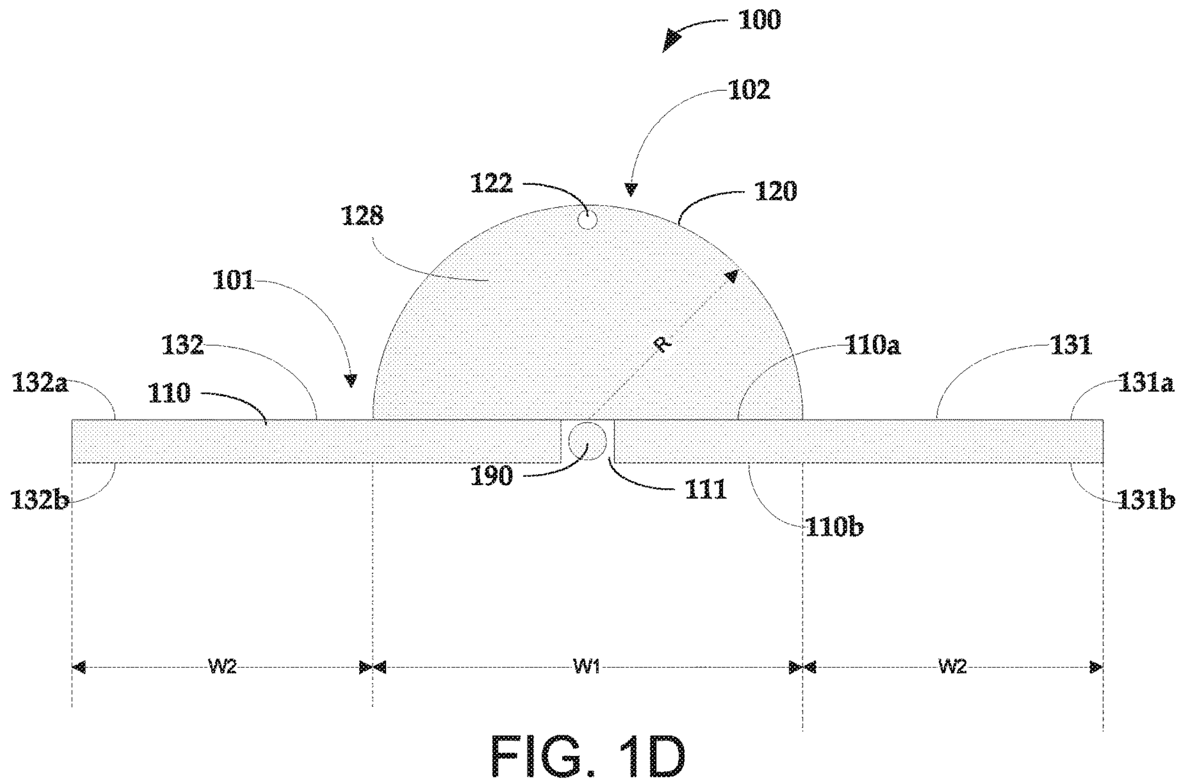
FIG. 1D and 1E are example cross sectional views of the mold device of FIG. 1A.
Figure 1E:
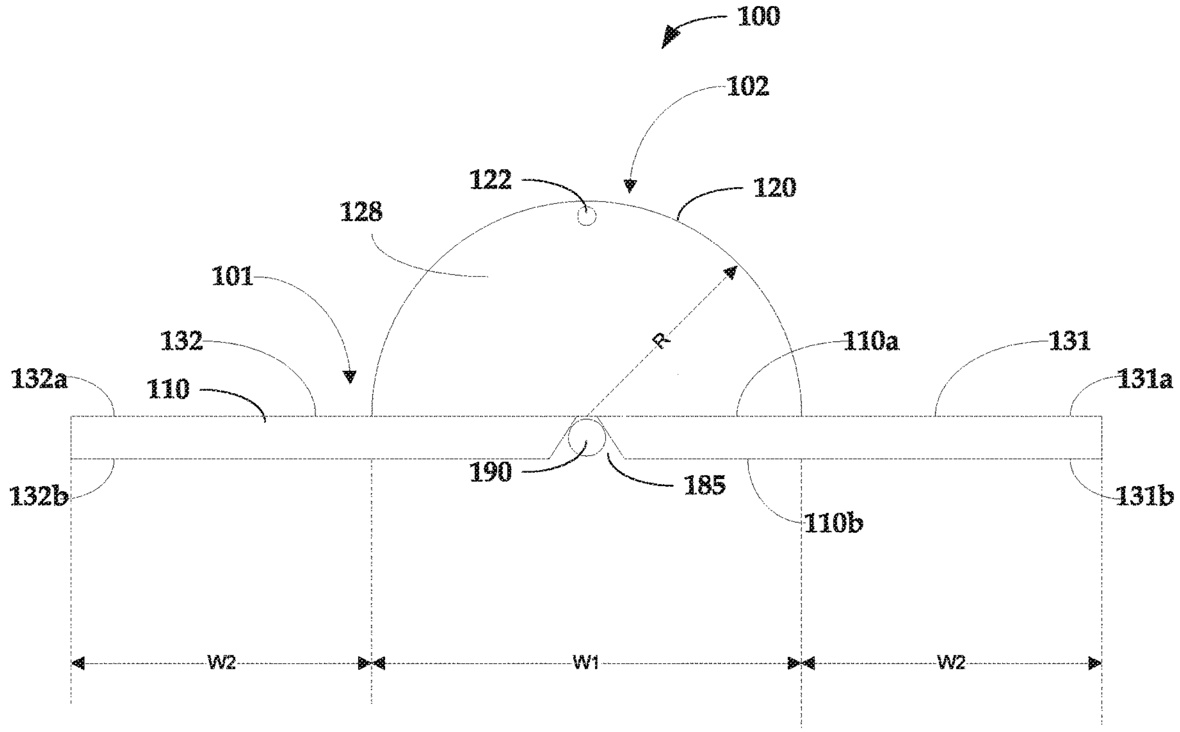

FIG. 1A shows a top perspective view of an optical fiber mold device 100 and FIGS. 1B and 1C show examples of a bottom view of the optical fiber mold device 100 in accordance with some embodiments. FIGS. 1D and 1E show an end cross sectional view of the mold device 100. The mold device 100 includes a first portion 101 comprising a base layer 110 having a longitudinal feature 111 configured to receive an optical fiber 190 (not shown in FIGS. 1A-1C-but illustrated in cross section in FIGS. 1D and 1E). The longitudinal feature 111 may comprise an opening, a groove, and/or a channel in the base layer 110, for example. In some embodiments, the longitudinal feature 111 may run the entire length of the base layer 110. The longitudinal feature 111 may run substantially parallel and/or proximate to the central longitudinal axis 191 of the device 100. Note that the base layer 110 need not be in the form of a polygon as shown in FIG. 1A through 1E. The base layer may have one or more curved sides as in FIG. 16, for example.

The mold device 100 includes at least one second portion 102 disposed proximate the base layer 110. The second portion 102 comprises a center wall 120 and front 128 and back 129 end walls. A mold cavity 103 can be configured so that an optical fiber sensor such as a fiber Bragg grating (FBG) sensor can be housed within the mold cavity 103. The mold device 100 may be formed as a unitary (single-piece) structure.

There is at least one first hole 121 in the mold cavity 103 is configured to allow mold material, e.g., epoxy, to enter the mold cavity 103. For example, the first hole 121 may be positioned at the top of the center wall 120 about midway between the front end wall 128 and the back end wall 129 in some configurations. The mold device 100 may include a plug 121*p* that blocks the hole 121 after filling the mold cavity 103 so that the mold material, e.g., epoxy does not substantially leak out after injection of the mold material.

There is at least one second hole 122 into the mold cavity 103 configured to allow air displaced by the mold material to exit the mold cavity 103. The mold device 100 may include a plug 122*p* that can be used to block the hole 122 after filling the mold cavity 103 so that the mold material does not substantially leak out of hole 122 after injection of the mold material. According to some implementations, the at least one second hole 122 may be positioned in the front end wall 128 and/or the back end wall 129, e.g., near the top of the front end wall 128 and/or back end wall 129. The second hole 122 (or multiple holes) can be disposed at defined location(s) that allow homogeneous filling of the mold cavity 103 with few voids. The design of the mold cavity 103 facilitates a defined "laminar" flow of the mold material. After the mold material cures, the optical fiber and/or FO sensor is securely held within the mold cavity 103.

The mold device 100 provides a permanent housing for the optical fiber and/or FO sensor. When the mold material enters the mold cavity it comes into contact with the optical fiber and/or FO sensor within the mold cavity. After injection of the mold material into the mold cavity of the mold device and subsequent curing of the mold material, the mold device and mold material seals and protects the fiber and/or FO sensor from environmental stress such as humidity, ultraviolet (UV) radiation, and/or animal intrusion, for example.

As illustrated in FIG. 1A, the front end wall 128 and/or the back end wall 129 of the mold cavity may be substantially flat. As discussed below, in some implementations, the front end wall and/or the back end wall of the mold cavity may be curved. FIG. 1A depicts a mold cavity 103 in which the center wall 120 is curved, e.g., forming a half cylinder. As discussed below, the center wall may have curved or substantially flat sides. In some embodiments, the center wall may have a top that is substantially flat.

Optionally, the base layer of the mold device includes side, front, and/or back extensions. In some configurations, as depicted in the top perspective view of FIG. 1A, the base layer 110 includes one or more extensions 131, 132, 141, 142 extending away from the mold cavity walls 120, 128, 129. As illustrated, the side extensions 131, 132 extend away from the center wall 120, the front extension 141 extends away from the front end wall 128, and the back extension 142 extends away from the back end wall 129.

As best seen in the bottom view of FIG. 1B and 1C and the cross sectional views of FIGS. 1D and 1E, the base layer 110 has a first major surface 110*a* and an opposing second major surface 110*b* with the mold cavity 103 disposed between the first major surface 110*a* and the second major surface 110*b*. FIG. 1C shows an example in which the first major surface 110*a* and the 110*b* are partially within the mold cavity 127 and a portion 125 of the mold cavity 127 is open.

In embodiments that include extensions, the each side extension 131, 132 has a first surface 131*a*, 132*a* and an opposing second surface 131*b*, 132*b*. The front extension 141 has a first surface 141*a* and an opposing second surface 141*b*. The back extension 142 has a first surface 142*a* and an opposing second surface 142*b*. As discussed in more detail below, any or all of these surfaces of the mold device 100 can be suitable for application of an adhesive that attaches the mold device to a structure. Adhesive may be disposed on one or more of the second major surface 110*b* of the base layer, the first surfaces 131*a*, 132*a* of the side extensions, the second surfaces of the side extensions 131*b*, 132*b*, the first surface of the front extension 141*a*, the second surface of the front extension 141*b*, the first surface of the back extension 142*a*, and the second surface of the back extension 142*b*.

As indicated in FIG. 1B, one or more of the bonding surfaces 110*b*, 131*a*, 131*b*, 132*a*, 132*b*, 141*a*, 141*b*, 142*a*, 142*b* of the mold device 100 may include capillary channels 155 configured to enhance bonding of the adhesive to facilitate attachment to the structure surface. The capillary channels 155 can also enhance strain transfer from the structure to the optical fiber and/or optical fiber sensor.

Suitable materials useful for forming the first and/or second portions 101, 102 of the mold device 100 include plastic, metal, silicone, and/or urethane, for example. The material of the first and/or second portions 101, 102 of the mold device 100 may be rigid or flexible allowing the mold device 100 to be installed on surfaces that are substantially flat or are not flat. The material of the first 101 and/or second portions may be transparent to wavelengths of visible light and/or to wavelengths of curing radiation. The adhesive used to bond the mold device 100 to the structure surface may be a fast curing adhesive to allow quick attachment of the optical fiber and/or optical fiber sensor to a structure. Suitable materials for the adhesive include double sided adhesive tape, single sided adhesive tape, a laminated adhesive superglue (cyanoacrylate), and/or epoxy, etc.

Referring now to FIGS. 1D and 1E, the width of the center wall, W1, may be in a range of about 2-10 mm, e.g., about 6 mm; the width of the side extensions, W2, may be in a range of about 2-10 mm, e.g., about 5 mm; and the radius of curvature of the center wall, R, may be in a range of about 1-5 mm, e.g., about 3 mm. The thickness of the mold material may be in a range of about 0.25 mm to about 0.75 mm, e.g., about 0.5 mm. These dimensional ranges are also applicable to other embodiments.

Figure 2:
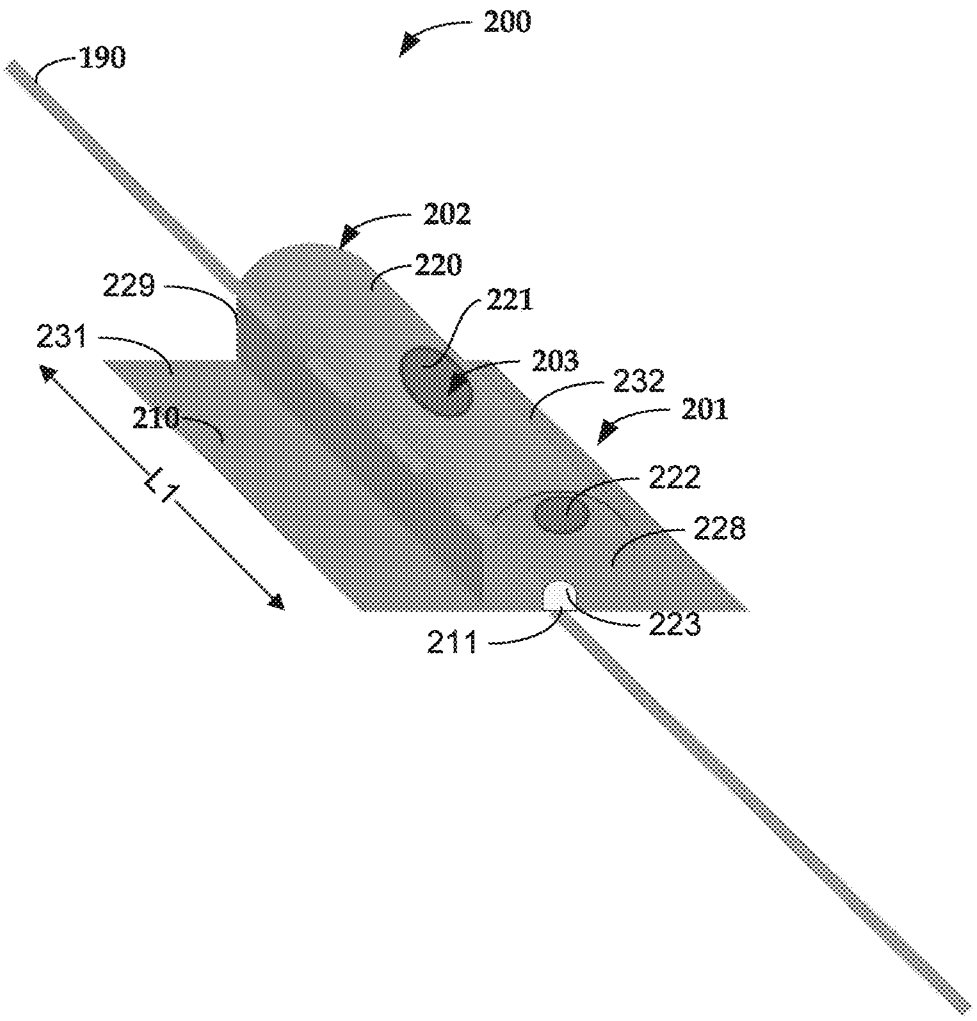
FIG. 2 is a perspective view of a mold device that includes a notch in the front and back walls in accordance with some embodiments.

Turning now to FIG. 2, there is shown a perspective view of a mold device 200 in accordance with some embodiments.

The mold device 200 includes a first portion 201 comprising a base layer 210 having side extensions 231, 232. The base layer 210 has a first major surface 210*a* within the mold cavity 203 and an opposing second major surface 210*b*. The side extensions 231, 232 each have a first major surface 231*a*, 232*a* and an opposing second major surface 231*b*, 232*b*. As presented in greater detail below, an adhesive may be disposed on the surfaces 210*b*, 231*a*, 231*b*, 232*a*, 232*b* to adhere the mold device 200 to a structure.

The base layer 210 includes a longitudinal feature 211 configured to receive an optical fiber 190. The longitudinal feature 211 may comprise longitudinal opening, channel, or groove running longitudinally along the base layer 210. As shown in the embodiment of FIG. 2, the longitudinal feature 211 may comprise a groove that runs the entire length, L1, of the base layer 210, for example.

The second portion 202 of the mold device 200 includes a center wall 220 with front and back end walls 228, 229 that are substantially flat. As depicted in FIG. 2, the sides of the center wall 220 may be substantially flat and the top of the center wall 220 may be curved. Alternatively, the top of the center wall may also be substantially flat. The second portion 202 covers a section of the base layer 210 and at least partially covers the longitudinal feature 211 of the base layer 210.

The first and second portions 201, 202 form a mold cavity 203. There is a first hole 221 in the mold cavity 203 configured to receive mold material into the mold cavity 203. In many configurations, the first hole 221 is located near the top of the center wall 220. The hole 221 may be positioned at any convenient location in the second portion 102 that facilitates injection of the mold material, e.g., about midway along the length of the center wall and about midway along the width of the center wall 220 as shown. There is a second hole 222 into the mold cavity 203 that allows air displaced by the mold material to exit the mold cavity 203. In some cases, there may be multiple holes. For example, a first hole may be disposed on wall 228 and a second hole may be disposed on wall 229. The hole 222 may be positioned at any convenient location in the second portion 102 that facilitates allowing air to escape during injection of the mold material. For example, in some embodiments the second hole 222 may be located near the center top of the front and/or back end walls 228, 229.

Figure 3:
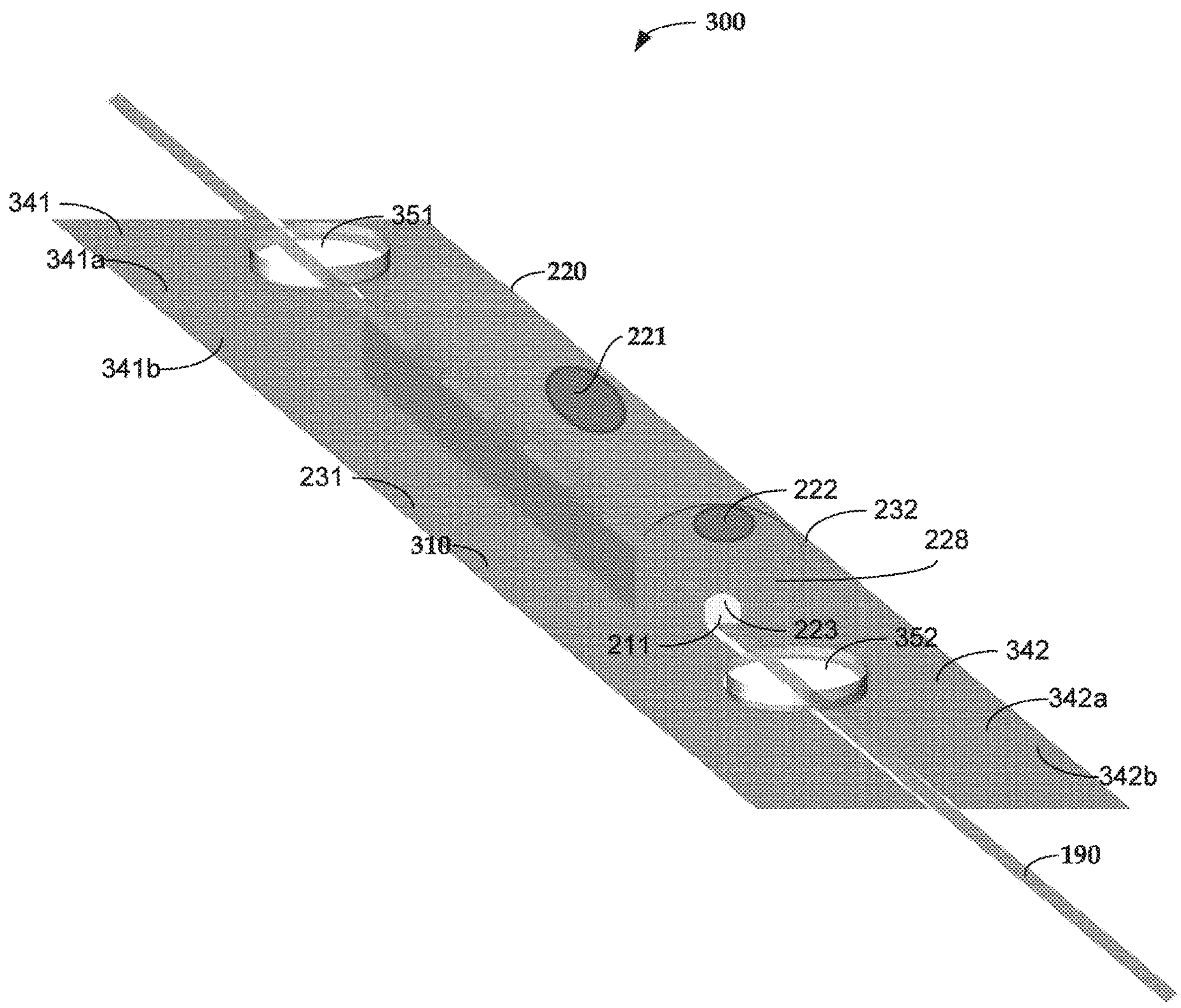
FIG. 3 is a perspective view of a mold device having front and back extensions in accordance with some embodiments.

The length of the mold device 200 may be in a range of about 1 cm to about 4 cm, e.g., about 2.5 cm. The diameter of the first hole 221 may be in a range of about 1 mm to 5 mm, e.g., about 3 mm. The diameter of the second hole 222 may be in a range of about 0.5 mm to about 1.0 mm, e.g., about 0.8 mm. The mold device 300 shown in the embodiment of FIG. 3 is similar in some aspects to that of mold device 200 shown in FIGS. 2A and 2B. However, mold device 300 includes a base layer 310 having optional front and back extensions 341, 342 that extend respectively from the front and back end walls 228, 229. The front extension 341 includes a first major surface 341*a* and an opposing second major surface 341*b*. The back extension 342 includes a first major surface 342*a* and an opposing second major surface 342*b*. As discussed further herein, an adhesive may be applied to one or more of the first major surfaces 341*a*, 342*a* and the second major surfaces 341*b*, 342*b* to adhesively attach the mold device 300 to a structure.

The front and back extensions 341, 342 may include features 351, 352 that extend at least partially through the extensions 341, 342 of the base layer 310. The indentations are suitable to contain glue that secures the optical fiber to the mold device 300 and/or to the structure. For example, in some embodiments, the indentations 351, 352 may comprise wells that do not extend through both the first major surfaces 341*a*, 342*a* and the second major surfaces 341*b*, 342*b*. Alternatively, the indentations may be holes that extend through both the first major surfaces 341*a*, 342*a* and the second major surfaces 341*b*, 342*b*. The indentations 351, 352 may be used to secure the optical fiber 190 for pretensioning during installation of the optical fiber 190 and mold device 300 as discussed below.

Figure 4:
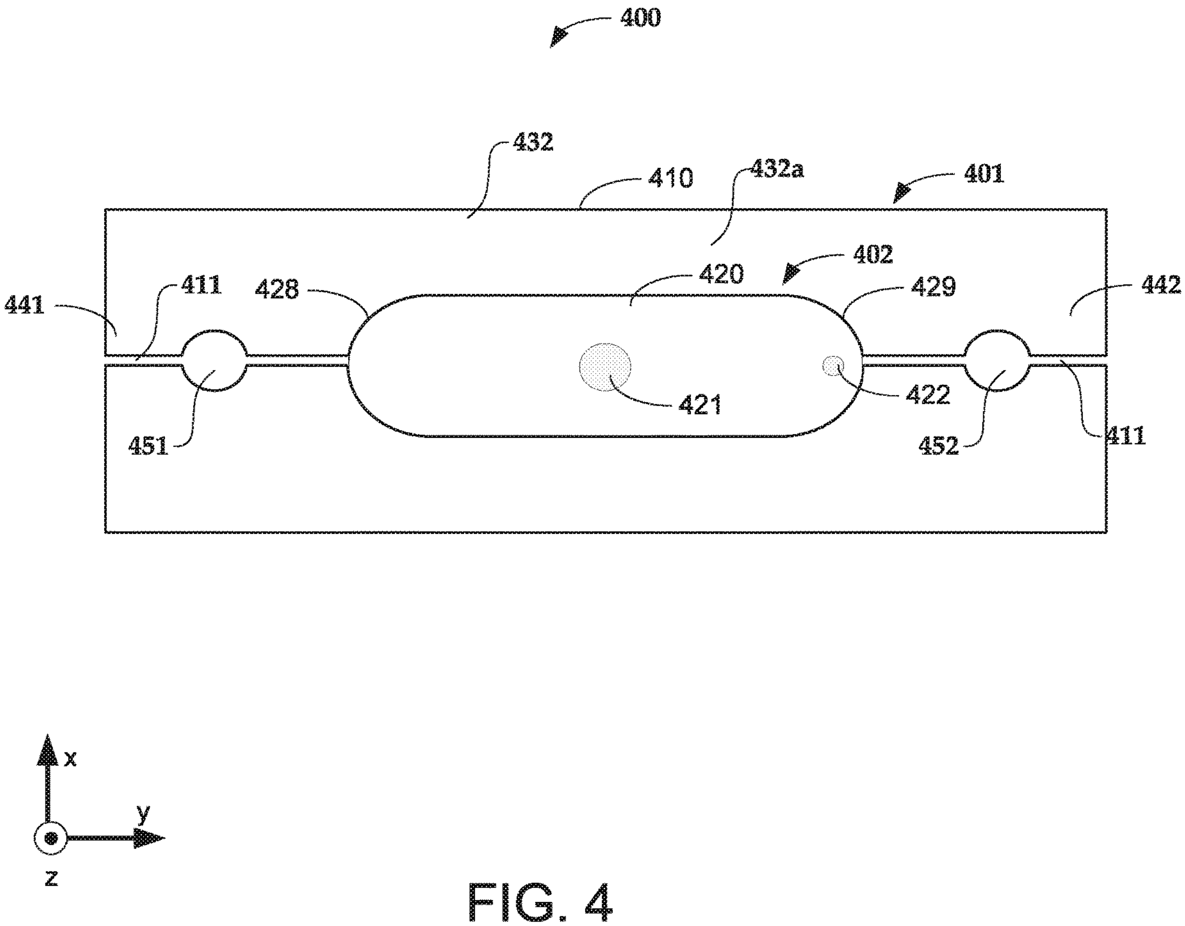
FIG. 4 is a top view of a mold device having curved front and back end walls in accordance with some embodiments.

FIG. 4 is a top view of a mold device 400 in accordance with some embodiments. The mold device 400 includes a first portion 401 and a second portion 402. The first portion comprises a base layer 410 having side extensions 431, 432 and front and back extensions 441, 442. The second portion 402 comprises a center wall 420, front wall 428 and back wall 429. The side extensions 431, 432 of the base layer 410 extend from the center wall 420, the front extension 441 of the base layer 410 extends from the front wall 428, and the back extension 442 of the base layer 410 extends from the back wall 429. Note that in this particular embodiment, the center wall, front wall, and back wall 420, 428, 429 are all curved.

A first hole 421 through the center wall 420 is located near the top of the center wall 420 and is configured to receive mold material. A second hole 422 is located in the back end wall 429 near the top of the back end wall. In many implementations, the position of the second hole 422 may be lower that the position of the first hole 451 along the z-axis. In some cases, the second hole 422 may include multiple second holes. For example, a hole may be disposed on wall 428 and a hole may be disposed on wall 429.

A longitudinal feature 411 comprising a longitudinal opening, groove, and/or channel that extends longitudinally in the base layer 410 along the y-axis. In this embodiment, the front extension 428 includes a hole 451 that extends all the way through the front extension layer 428. The back extension 429 includes a hole 452 that extends all the way through the back extension layer 429. Note that in this embodiment, the holes 451, 452 in the front and back extensions 428, 429 merge with the longitudinal opening 411. According to various embodiments, hole 451 and/or hole 452 may comprise a well that includes a hole having walls.

Figure 5A:
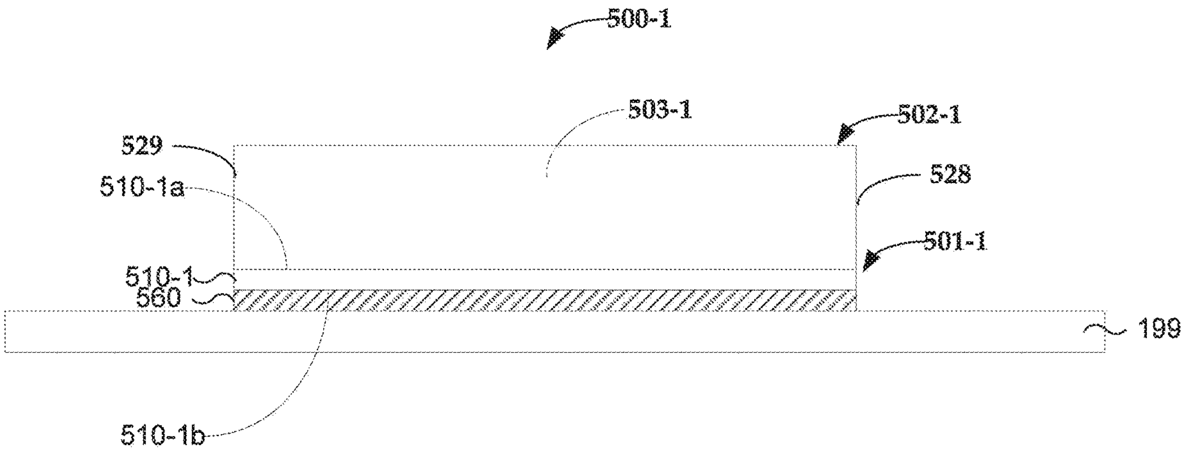
FIG. 5A is a side cross sectional view of a mold device having adhesive disposed on the lower surface of the mold device in accordance with some embodiments.
Figure 5B:
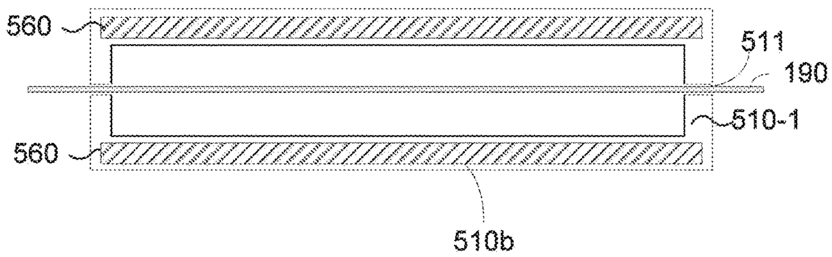
FIG. 5B is a bottom view of the mold device of FIG. 5A.

FIGS. 5A and 5B are directed to a mold device 500 1 in accordance with some embodiments. FIG. 5A is a side cross sectional view of the mold device 500-1 and structure 199. FIG. 5B shows a bottom view of the mold device 500-1. Mold device 500-1 includes first portion 501-1 comprising a base layer 510-1 without side, front, or back extensions. A longitudinal feature 511 is configured to receive an optical fiber 190. A second portion 502-1 is disposed on the base layer 510-1 such that the second portion 502-1 and the base layer 510-1 form a mold cavity 503-1. As depicted in FIGS. 5A and 5B, the base layer 510-1 has a first major surface 510-1*a* proximate the mold cavity 503-1 and an opposing second major surface 510-1*b*. An adhesive 560, e.g., a glue, such as epoxy, super glue (cyanoacrylate) and/or double sided adhesive tape, is disposed on the second major surface 510-1*b* of the base layer 510-1 on either side of the mold cavity 503-1. When the mold device 500-1 is installed on a structure 199, the adhesive 560 is located between the surface of the structure 199 and the second surface 510-1*b* of the base layer 510-1. The adhesive 560 is selected to form a bond between the mold device 500-1 and the structure 199.

Figure 5C:
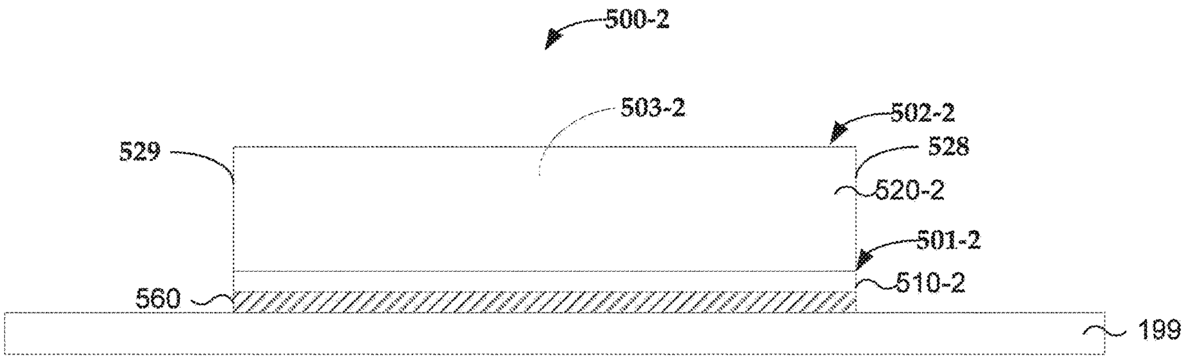
FIG. 5C is a side cross sectional view of a mold device having adhesive disposed on the lower surfaces of the side extensions of the mold device in accordance with some embodiments.
Figure 5D:
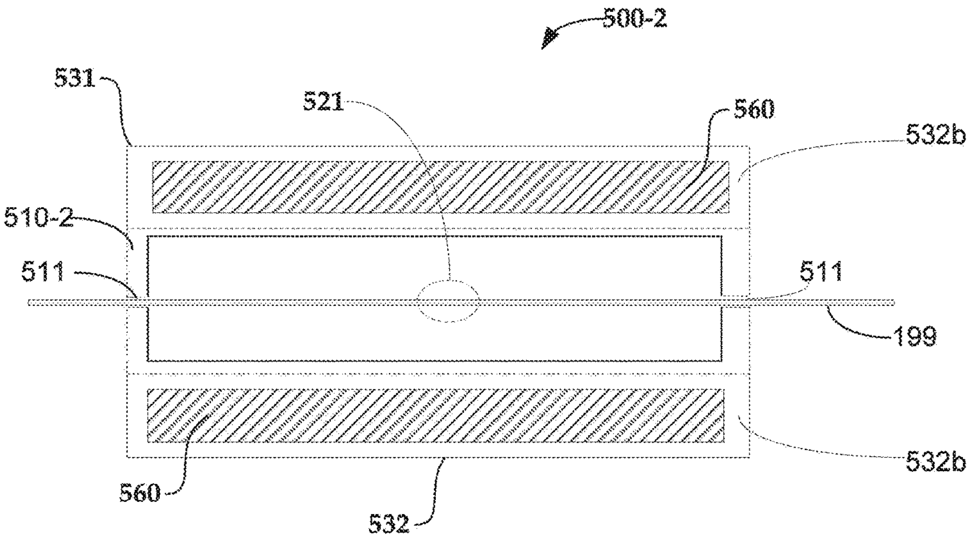
FIG. 5D is a bottom view of the mold device of FIG. 5C.

FIG. 5C is a side cross sectional view of a mold device 500-2 and structure 199 in accordance with some embodiments. FIG. 5D shows a bottom view of the mold device 500-2. Mold device 500-2 includes a first portion 501-2 comprising a base layer 510-2 having side extensions 531, 532. A longitudinal feature 511 is configured to receive and secure an optical fiber 190. A second portion 502-2 is disposed on the base layer 510-2 such that the second portion 502-2 and the base layer 510-2 form a mold cavity 503-2. The second portion 502-2 includes a first hole 521 as shown. As best seen in the bottom view of FIG. 5D, side extension 531 has a second major surface 531*b* and side extension 532 has a second major surface 532*b*. In the illustrated embodiment, an adhesive 560, e.g., glue, such as epoxy, superglue (cyanoacrylate), or double sided adhesive tape, is disposed on the second major surfaces 531*b*, 532*b* of extensions 531, 532. When the mold device 500-2 is installed on a structure 199, the adhesive 560 is located between the surface of the structure 199 and the second surfaces 531*b*, 532*b* of the extensions 531, 532. The adhesive 560 is selected to form a bond between the mold device 500-2 and the structure 199.

Figure 6A:
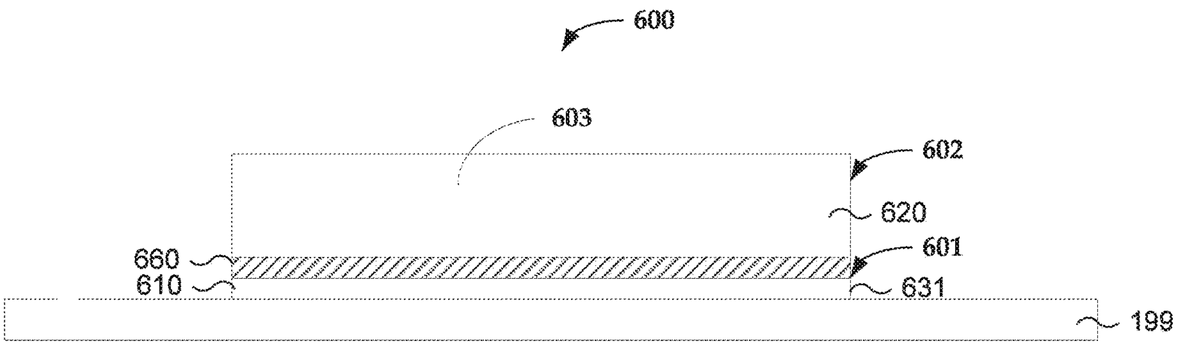
FIG. 6A is a side cross sectional view of a mold device having adhesive disposed on the upper surfaces of the side extensions of the mold device in accordance with some embodiments.
Figure 6B:
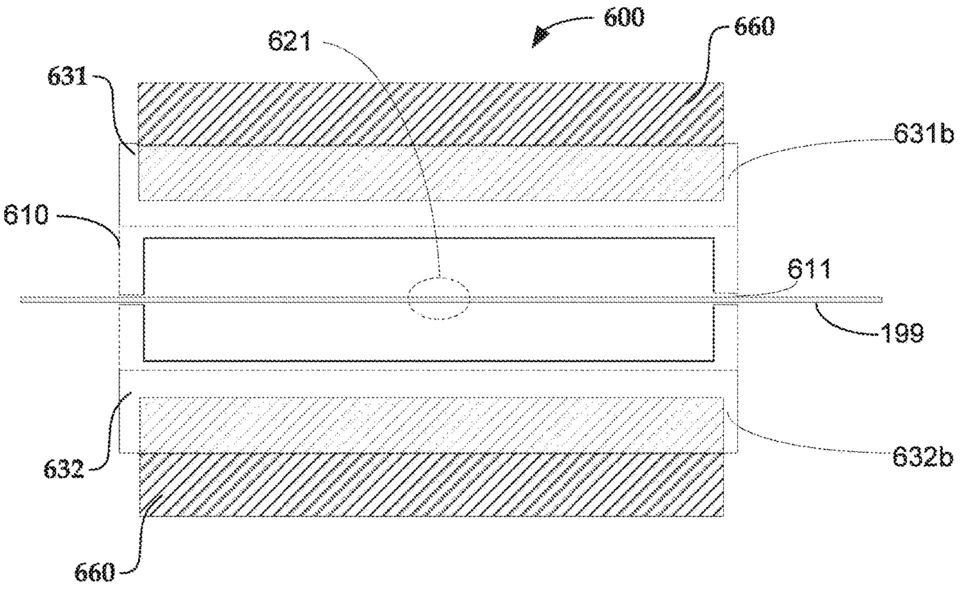
FIG. 6B is a bottom view of the mold device of FIG. 6A.
Figure 6C:
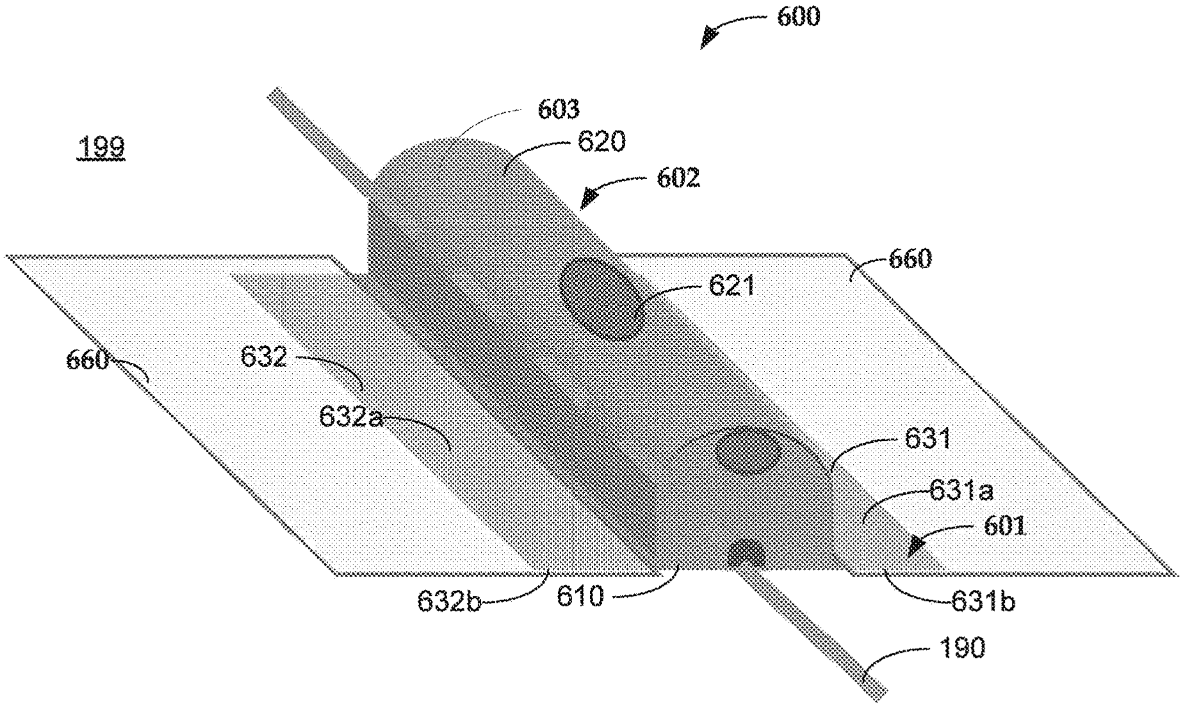
FIG. 6C is a perspective view of the mold device of FIG. 6A.

FIGS. 6A through 6C illustrate an embodiment in which adhesive tape 660 e.g., single sided adhesive tape, is disposed on the first surfaces 631*a*, 632*a* of the side extensions 631, 632 of a mold device 600 in accordance with some embodiments. The adhesive tape 660 extends across the first surfaces 631*a*, 632*a* of the side extensions and extends over the surface of the structure 199 thus adhering the mold device 600 to the structure 199. FIG. 6A shows a side cross sectional view of the mold device 600. FIG. 6B shows the bottom view of the mold device 600 and FIG. 6C provides a perspective view of the mold device 600 and structure 199. Mold device 600 includes a first portion 601 comprising a base layer 610 having side extensions 631, 632. A second portion 602 is disposed on the base layer 610 such that together the second portion 602 and the base layer 610 form a mold cavity 603 as discussed previously. The second portion 620 includes a first hole 621 in the center wall as shown. As best seen in the bottom view of FIG. 6B, side extension 631 has a second major surface 631*b* and side extension 632 has a second major surface 632*b*. The second major surfaces 631*b*, 632*b* make contact with the surface of the structure. A longitudinal feature 611 is configured to receive and secure an optical fiber 190.

As best seen in the perspective view of FIG. 6C, side extension 631 has a first major surface 631*a* and side extension 632 has a first major surface 632*a*. In the illustrated embodiment, an adhesive 660, which may be a single sided tape, is disposed on the first major surfaces 631*a*, 632*a* of extensions 631, 632 and extends beyond the extensions 631, 632 onto the surface of the structure 199. The adhesive 660 is selected to form a bond between the surface of the structure 199 and the mold device 600 so as to securely hold the mold device 600 against the structure 199.

Figure 7:
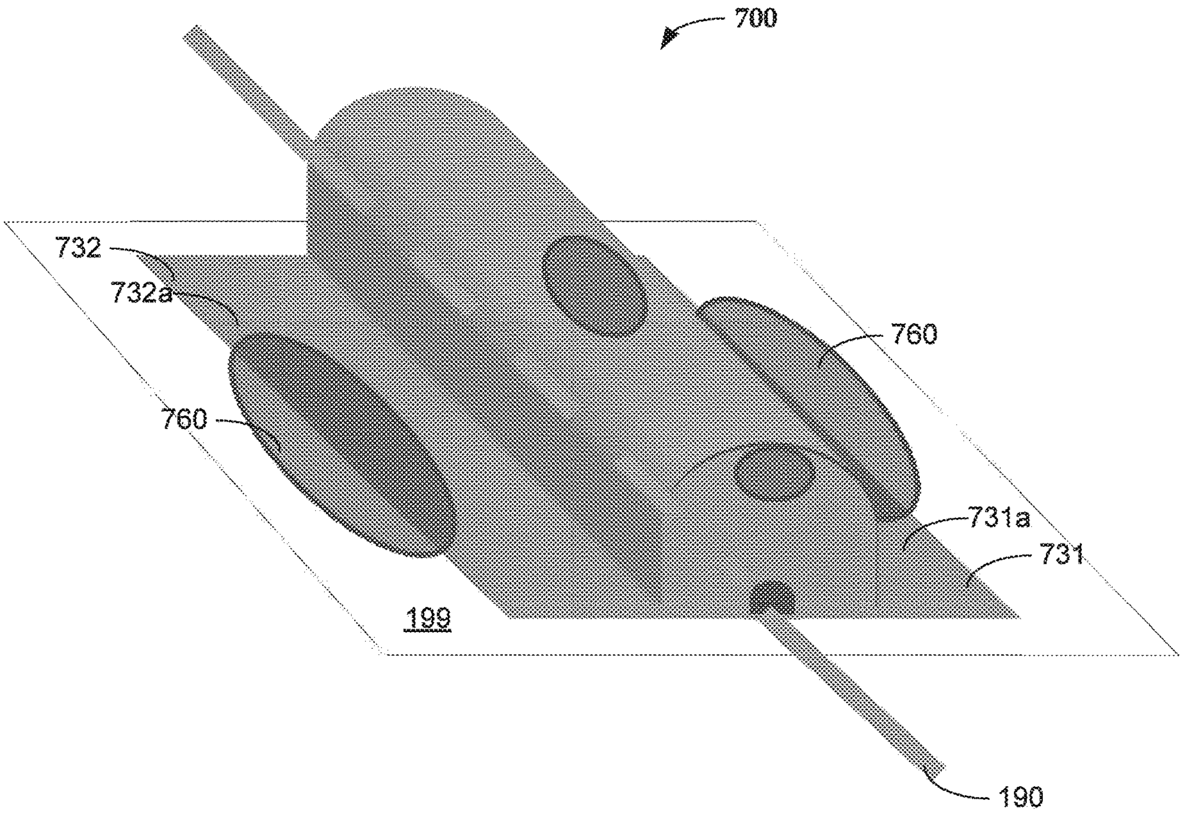
FIG. 7 is a perspective view of a mold device having a flowable adhesive disposed on the upper surfaces of side extensions of the mold device in accordance with some embodiments.

FIG. 7 illustrates a mold device 700 in accordance with some embodiments. In this particular embodiment, a flowable glue, such as superglue (cyanoacrylate), or epoxy, is used to bond the mold device 700 to the structure 199. The glue 760 is disposed on the top surfaces 731*a*, 732*a* of the side extensions 731, 732 of the mold device 700 and extends out over a portion of the surface of the structure 199.

Figure 8A:
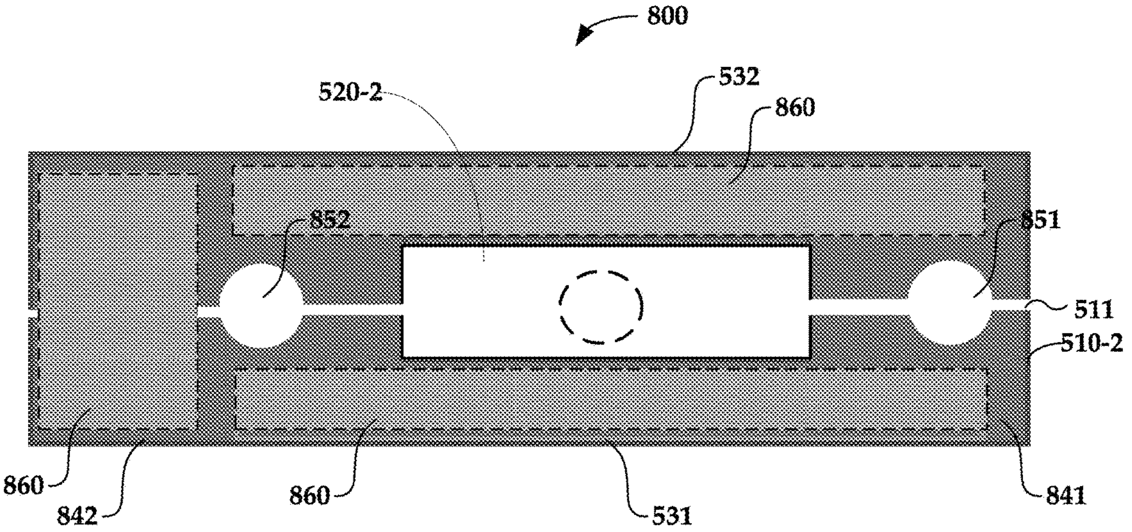
FIG. 8A is a bottom view of a mold device having adhesive disposed on bottom surfaces of the side extensions and front and back extensions in accordance with some embodiments.
Figure 8B:
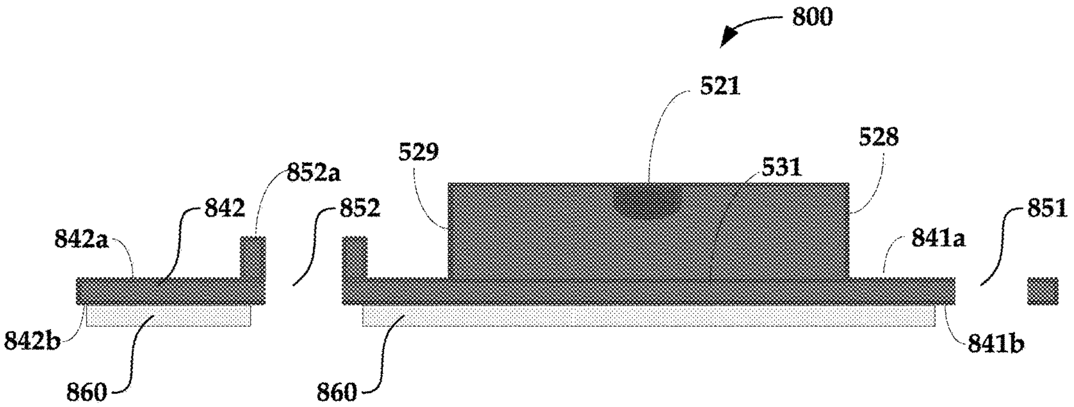
FIG. 8B is a side cross sectional view of the mold device of FIG. 8A.

FIGS. 8A and 8B show a mold device 800 in accordance with embodiments. FIGS. 8A and 8B respectively show a bottom view and side cross sectional view of device 800. The mold device 800 shown in FIGS. 8A and 8B has a number of features that are substantially similar to the features of mold device 500-2 previously discussed and illustrated in FIGS. 5C and 5D. In FIGS. 8A and 8B, the same reference numbers are used to refer to the substantially similar features shown in FIGS. 5C and 5D. FIG. 8A depicts a bottom view of mold device 800. FIG. 8B is a side cross sectional view of mold device 800.

The mold device 800 differs from device 500-2 in that mold device 800 includes front and back extensions 841, 842 extending away from the front and back walls 528, 529, respectively. An adhesive 860 is disposed on the front and back extensions 841, 842. Each of the front and back extensions 841, 842 respectively include front and back features 851, 852 in the extension 531, 532. In this particular embodiment, features 851, 852 are holes through the extension 531, 532. As depicted in the cross sectional diagram of FIG. 8B, hole 852 includes a lip 852*a*. Optionally one or both holes include a lip 852*a* that is configured to contain glue within the hole after the glue is deposited in the hole 852.

As best seen in the cross sectional diagram of FIG. 8B, each extension 841, 842 includes a first major surface 841*a*, 842*a* proximate the front and back walls 528, 529 and an opposing second surface 841*b*, 842*b*. An adhesive 860 is disposed on the second major surfaces 531*b*, 532*b* of the side extensions 531, 532 such that the adhesive 860 extends over the surfaces and 531*b*, 532*b* of the side extensions 531, 532 and over the second major surfaces 841*b*, 842*b* of the front and back extensions 841, 842. Additional adhesive is shown on the second surface 842*b* of back extension 842.

Figure 9A:
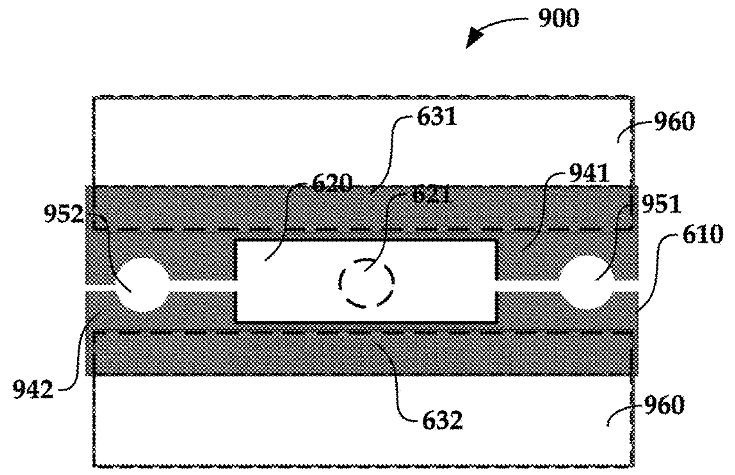
FIG. 9A is a bottom view of a mold device having an adhesive tape disposed on the upper surfaces of the mold device in accordance with some embodiments.
Figure 9B:
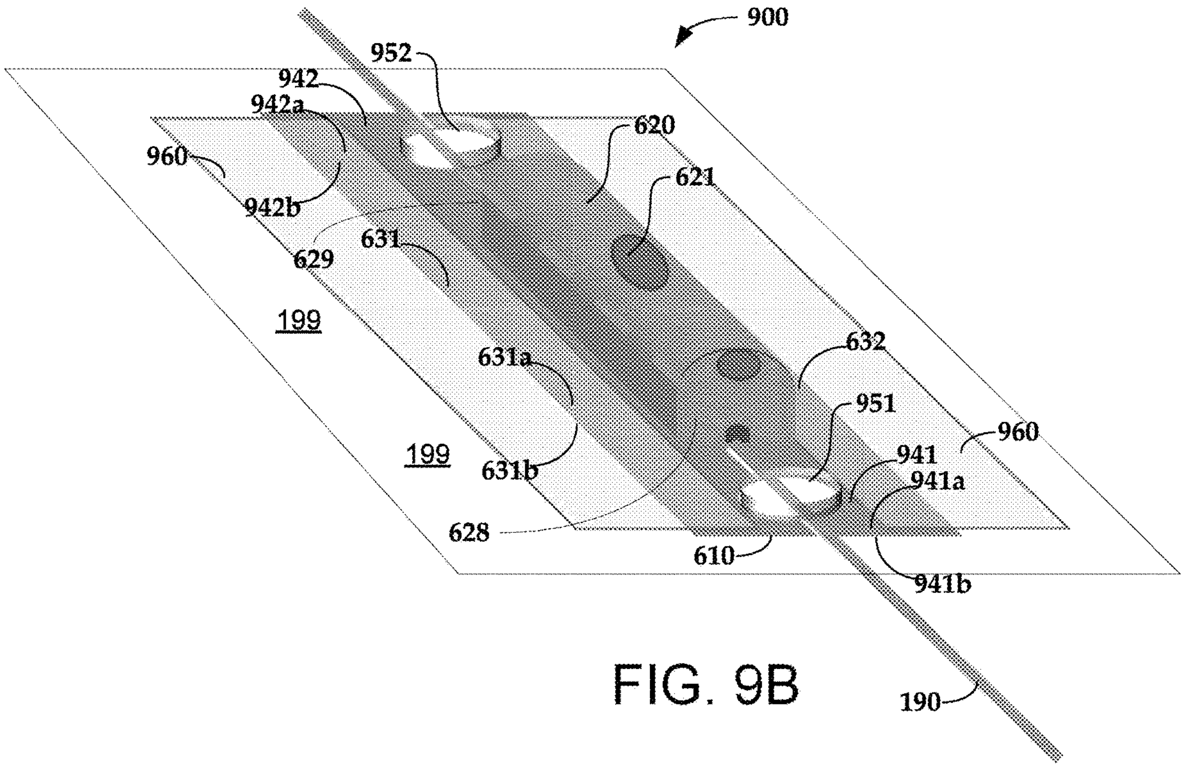
FIG. 9B is a perspective view of the mold device of FIG. 9A.

The mold device 900 shown in FIGS. 9A and 9B has a number of features that are substantially similar to the features of mold device 600 depicted in FIGS. 6A through 6C. In FIGS. 9A and 9B, the same reference numbers are used to refer to the substantially similar features shown in FIGS. 6A through 6C. FIG. 9A depicts a bottom view of mold device 900. FIG. 9B is a perspective view of mold device 900.

The mold device 900 differs from device 600 in that mold device 900 includes front and back extensions 941, 942 extending away from the front and back walls 628, 629, respectively. Each of the front and back extensions 941, 942 includes a feature 951, e.g., a well or hole 952 in the extension layer.

As best seen in the diagram of FIG. 9B, each extension 941, 942 includes a first major surface 941*a*, 942*a* proximate the front and back walls 628, 629 and an opposing second surface 941*b*, 942*b*. An adhesive 960 is disposed on the first major surfaces 631*a*, 632*a* of the side extensions 631, 632 such that the adhesive 960 extends over the surfaces and 631*a*, 632*a* of the side extensions 631, 632 and also over the first major surfaces 941*a*, 942*a* of the front and back extensions 941, 942. The adhesive, which may be a single-sided tape, extends from the extensions 631, 632, 941, 942 out over the surface of the structure 199 so as to adhere the mold device 900 to the structure 199.

According to some implementations, two or more of the mold devices may be used together to form sensing clusters. This technique is useful for sensing a parameter in multiple dimensions, for example. A particularly useful configuration is the biaxial configuration in which two sensors are arranged along two orthogonal axes (see, e.g., FIG. 12). Another useful configuration is a rosette configuration in which two sensors are arranged along two orthogonal axes and a third sensor is arranged at an angle of about 45 degrees to the orthogonal axes (see, e.g., FIG. 11A). When sensors are used in clusters, the shape of mold device can be designed to facilitate alignment of multiple mold devices. The multiple mold devices can be used to bond to multiple fiber sensors in certain well defined configurations. Engagement features on the mold devices may provide for orientation of the mold devices and/or for locking the mold devices together.

Figure 10:
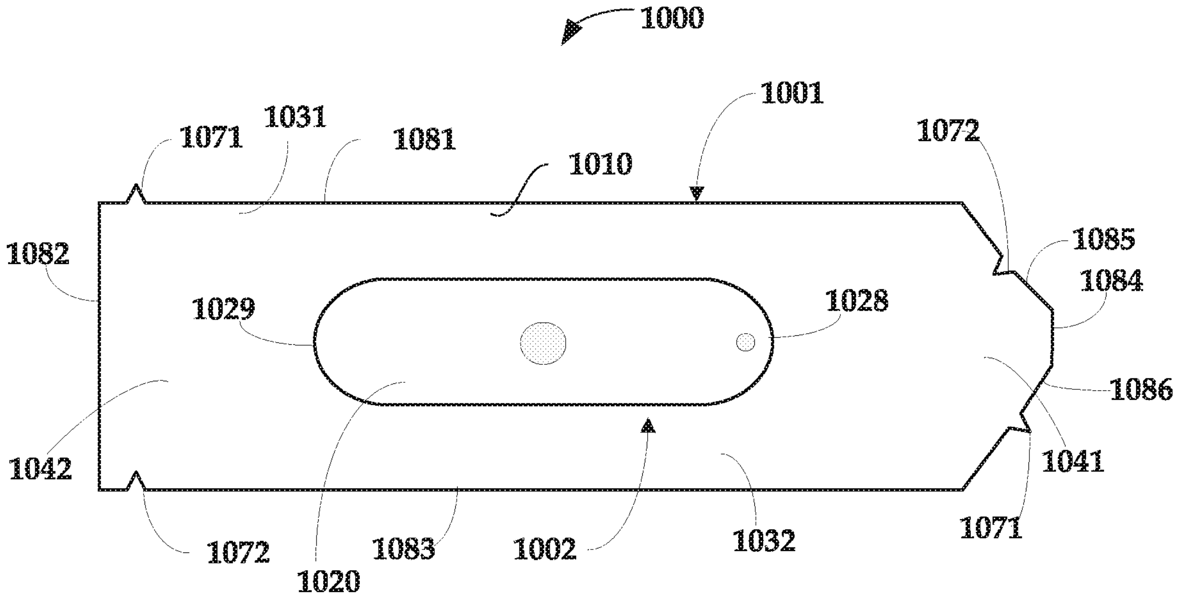
FIG. 10 is a top view of a mold device having engagement feature disposed on the base layer in accordance with some embodiments.

FIG. 10 is a diagram showing a mold device 1000 that includes engagement features useful to orient and/or interlock multiple mold devices in a pattern. Mold device 1000 comprises a first potion 1001 that includes a base layer 1010 having side extensions 1031, 1032 and front and back extensions 1041, 1042. A second portion 1002 is disposed on the base layer 1010, the second portion 1002 including a center wall 1020 and front and back walls 1028, 1029. According to some embodiments, the base layer 1010 forms a polygon having substantially straight edges 1081, 1082, 1083, 1084, 1085, 1086. Some of the edges are oriented at 90 degrees to one another, e.g., edges 1081, 1082 and some edges are sloped, e.g., oriented at angles different from 90 degrees. For example, edge 1085 is oriented at a 45 degree angle with respect to edge 1081 and edge 1086 is oriented at a 45 degree angle with respect to edge 1083. When multiple mold devices are used together in a pattern, the sloped edges can be used to make mitered corners, e.g., see FIG. 12.

In some embodiments, the edges may include additional engagement features that orient and/or lock the mold devices together. For example, along edges 1081 and 1086, mold device 1000 includes protrusions 1071 that are compatible to receive indentations 1072 disposed on edges 1083 and 1085 of another mold device. Other engagement features may include sloped sides, grooves and/or other features that serve to orient, connect, and/or lock the mold devices together. According to various embodiments, the configuration shown in FIG. 10 may include one or more of longitudinal openings, grooves, channels and/or temporary epoxy openings similar to features 951 and 952.

Figure 11A:
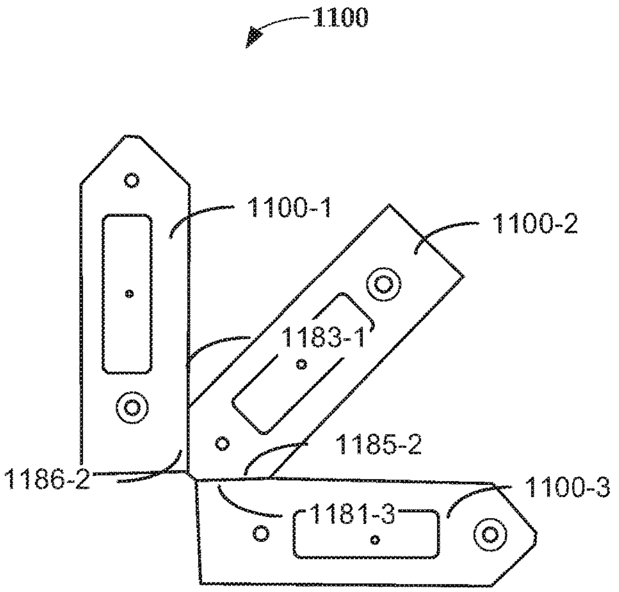
FIG. 11A shows mold device arranged in a rosette pattern in accordance with some embodiments.

FIG. 11A shows a cluster 1100 of mold devices 1100-1, 1100-2, 1100-3 arranged in a rosette pattern. The sloped edge 1186-2 of mold device 1100-2 is arranged so that it is adjacent to straight edge 1183-1 of device 1100-1. The sloped edge 1185-2 of mold device 1100-2 is arranged adjacent to straight edge 1181-3 of device 1100-3. The arrangement of edges 1183-1, 1186-2, 1185-2, 1181-3 forms a mitered corner between the mold devices 1100-1, 1100-2, 1100-3.

Figure 11B:
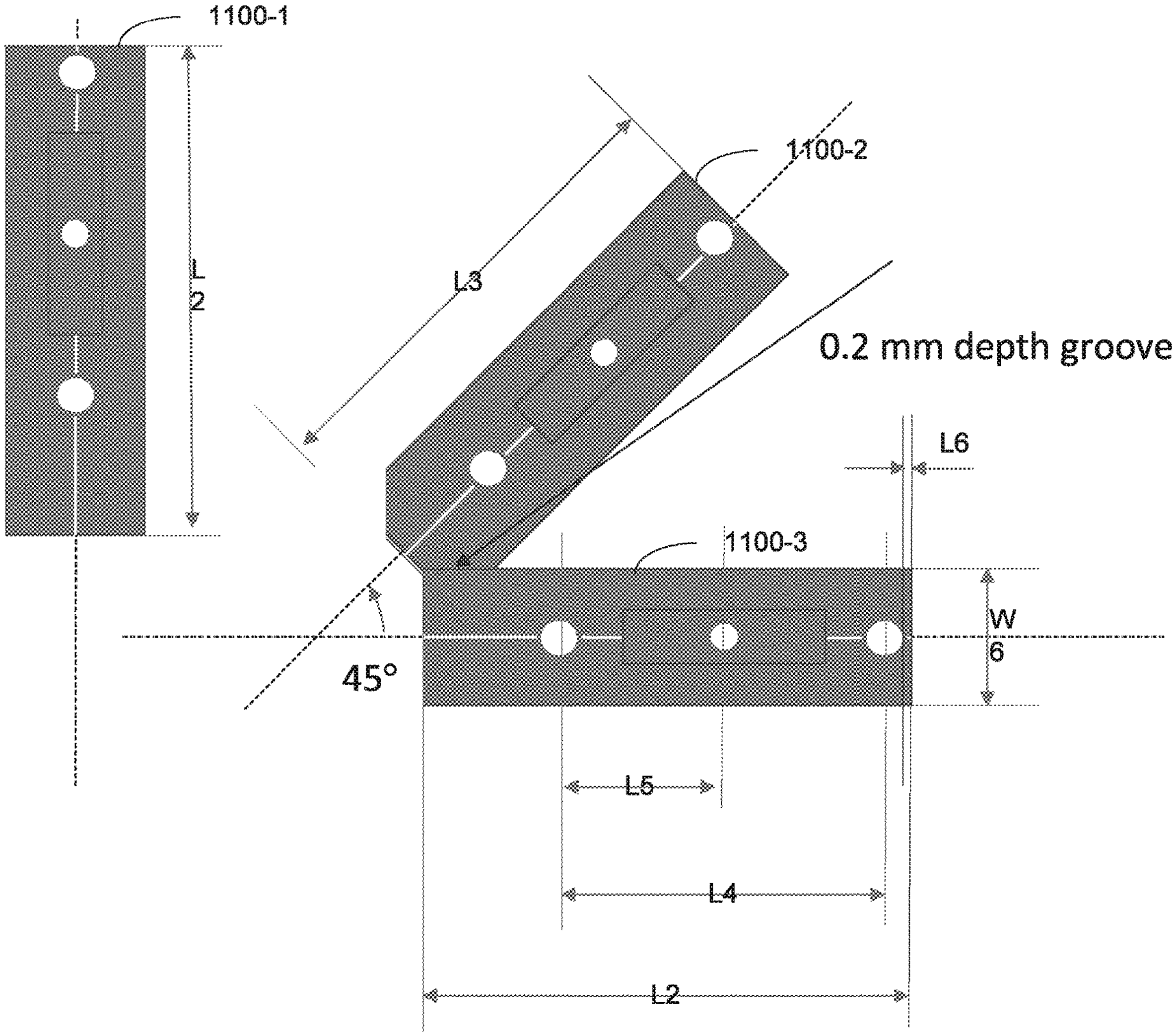
FIG. 11B shows representative dimensions for the mold devices of FIG. 11A.

FIG. 11B provides another example of mold devices 1100-1, 1100-2, 1100-3 arranged in a rosette pattern with representative dimensions. The length, L2, of mold device 1100-1, 1100-3 is in a range of about 2 to 10 cm, e.g. about 6 cm. The length, L3, of mold device 1100-2 is in a range of about 2 to 10 cm, e.g. about 5.7 cm. The width, W6, of the mold devices 1100-1, 1100-2, 1100-3, is in a range of about 0.5 cm to about 2.5 cm, e.g., about 1.7 cm. The center-to-center distance, L4, between the front feature and the back feature is in a range of about 2 cm to 6 cm, e.g., about 4 cm. The center-to-center distance, L5, between the back feature and the first hole in the second portion is in a range of about 1 cm to about 3 cm, e.g., about 2 cm. The distance, L6, between the front edge and the center of the front feature is in a range of about 0.5 mm to about 2 mm, e.g., about 1 mm.

Figure 12:
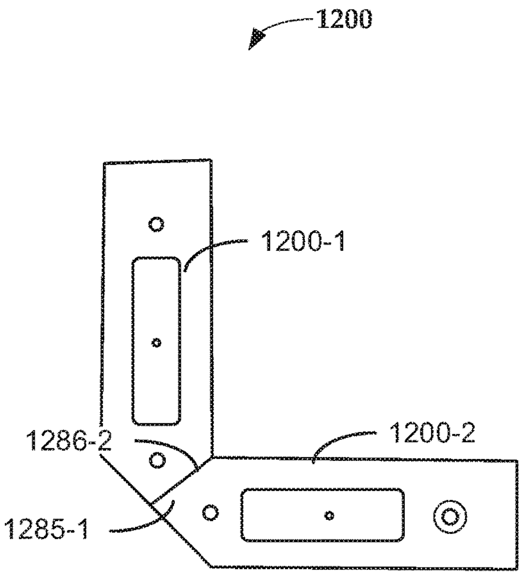
FIG. 12 shows mold devices arranged in a biaxial pattern in accordance with some embodiments.

FIG. 12 shows a cluster 1200 of mold devices 1200-1, 1200-2 arranged in a biaxial pattern. The sloped edge 1286-2 of mold device 1200-2 is arranged so that it is adjacent to the sloped edge 1285-1 of device 1200-1. The arrangement edges 1286-2, 1285-1 forms a mitered corner between the mold devices 1200-1, 1200-2.

Figure 13A:
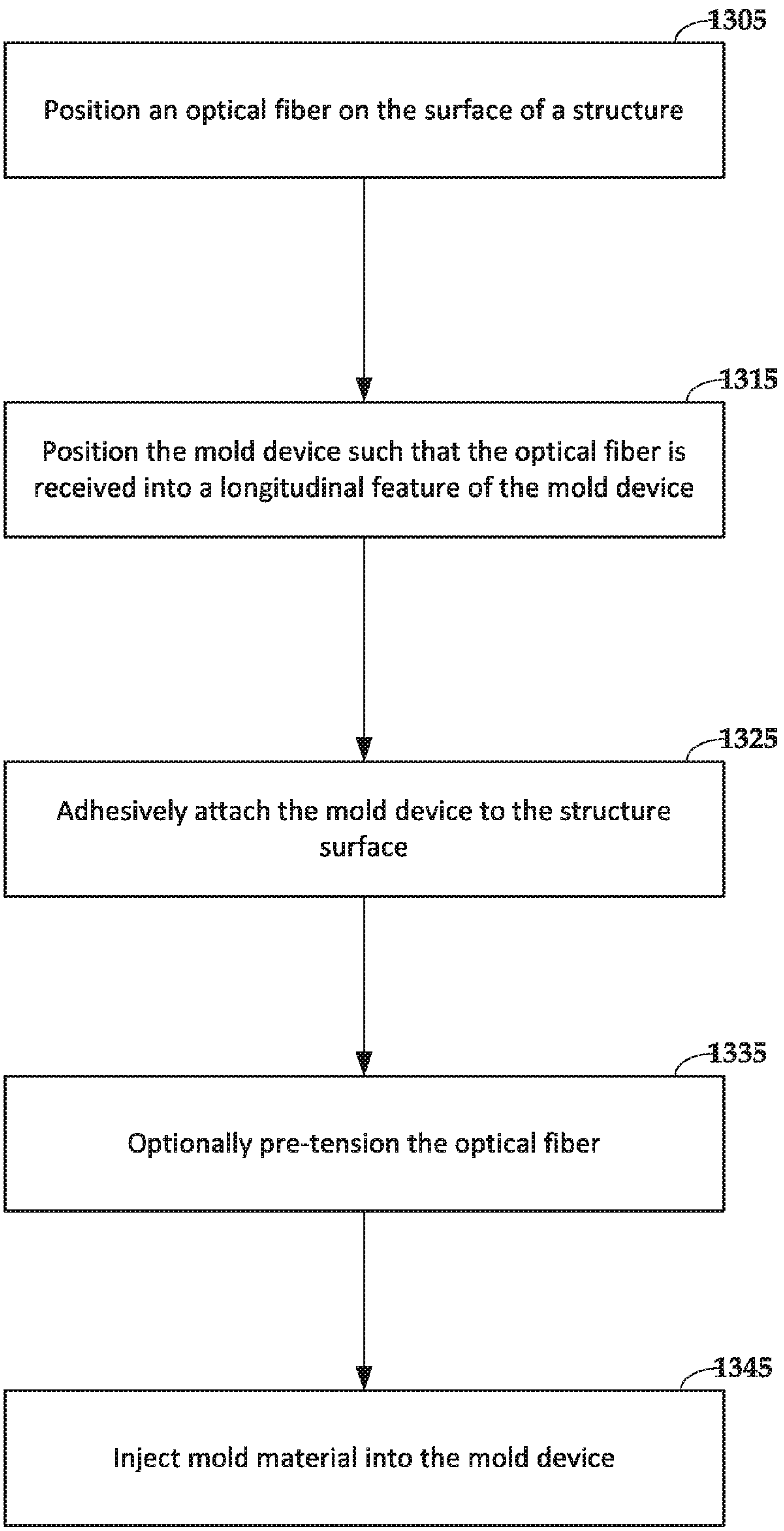
FIGS. 13A and 13B are flow diagrams illustrating processes of using mold devices in accordance with some embodiments.

FIG. 13A is a flow diagram illustrating a method of using the mold device to affix an optical fiber to the surface of a structure. The method of FIG. 13A is suitable when the longitudinal feature includes a longitudinal opening in the base layer. According to this method, the optical fiber is positioned 1305 on the surface of the structure. The mold device is positioned 1315 on the surface of the structure such that the optical fiber is received into the longitudinal opening. The mold device is adhesively attached 1325 to the structure surface by an adhesive disposed on the top and/or bottom surfaces of the mold device. Optionally, the optical fiber is pre-tensioned 1335 before mold material is injected 1345 into the mold device.

Figure 13B:
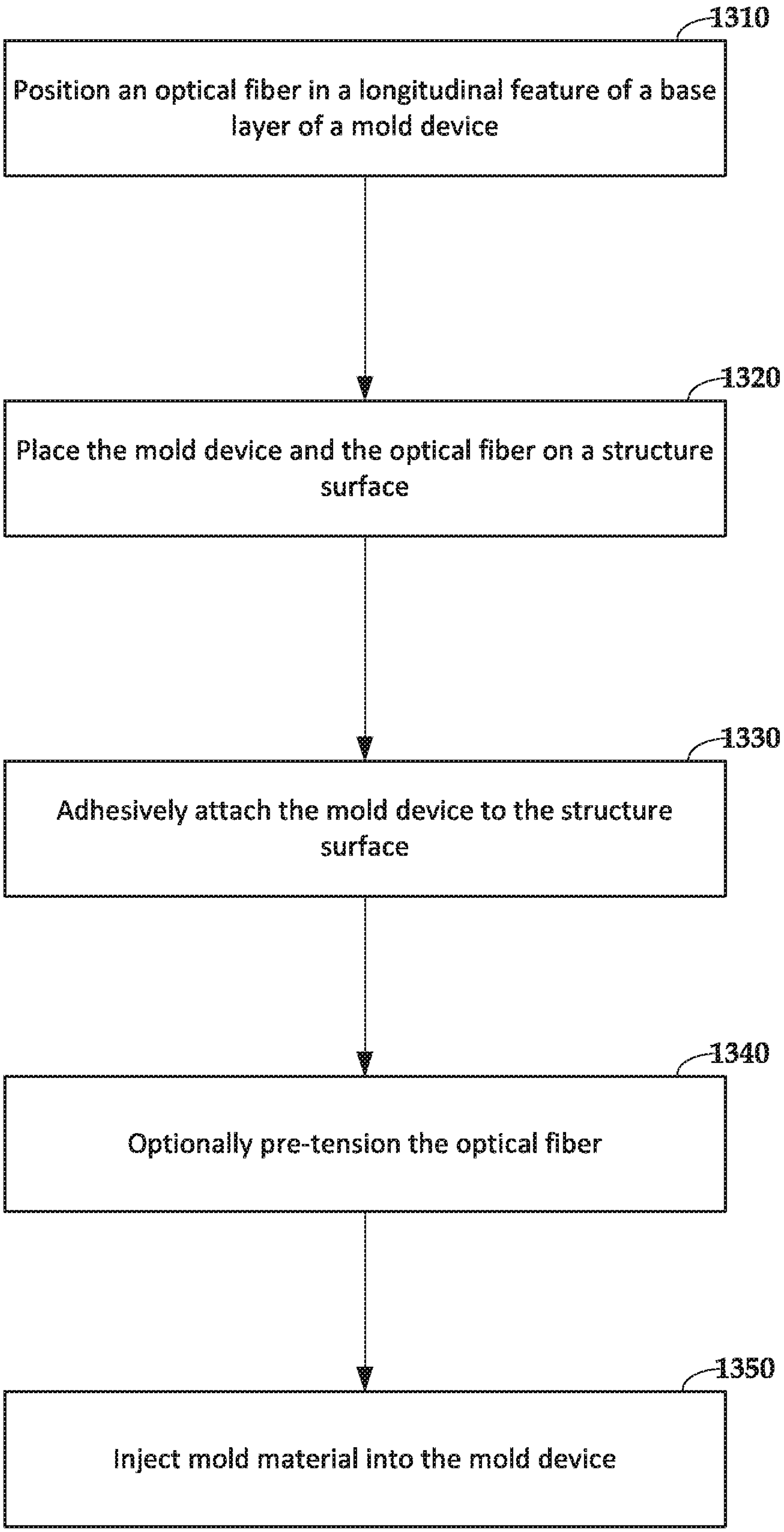

FIG. 13B is a flow diagram illustrating a method of using the mold device to affix an optical fiber to the surface of a structure. In this particular embodiment, an optical fiber is positioned 1310 in longitudinal feature of a mold device. The mold device and optical fiber are placed 1320 on the surface of the structure. The mold device is adhesively attached 1330 to the structure surface by an adhesive disposed on the top and/or bottom surfaces of the mold device. Optionally, the optical fiber is pre-tensioned 1340 before mold material is injected 1350 into the mold device.

Figure 14:
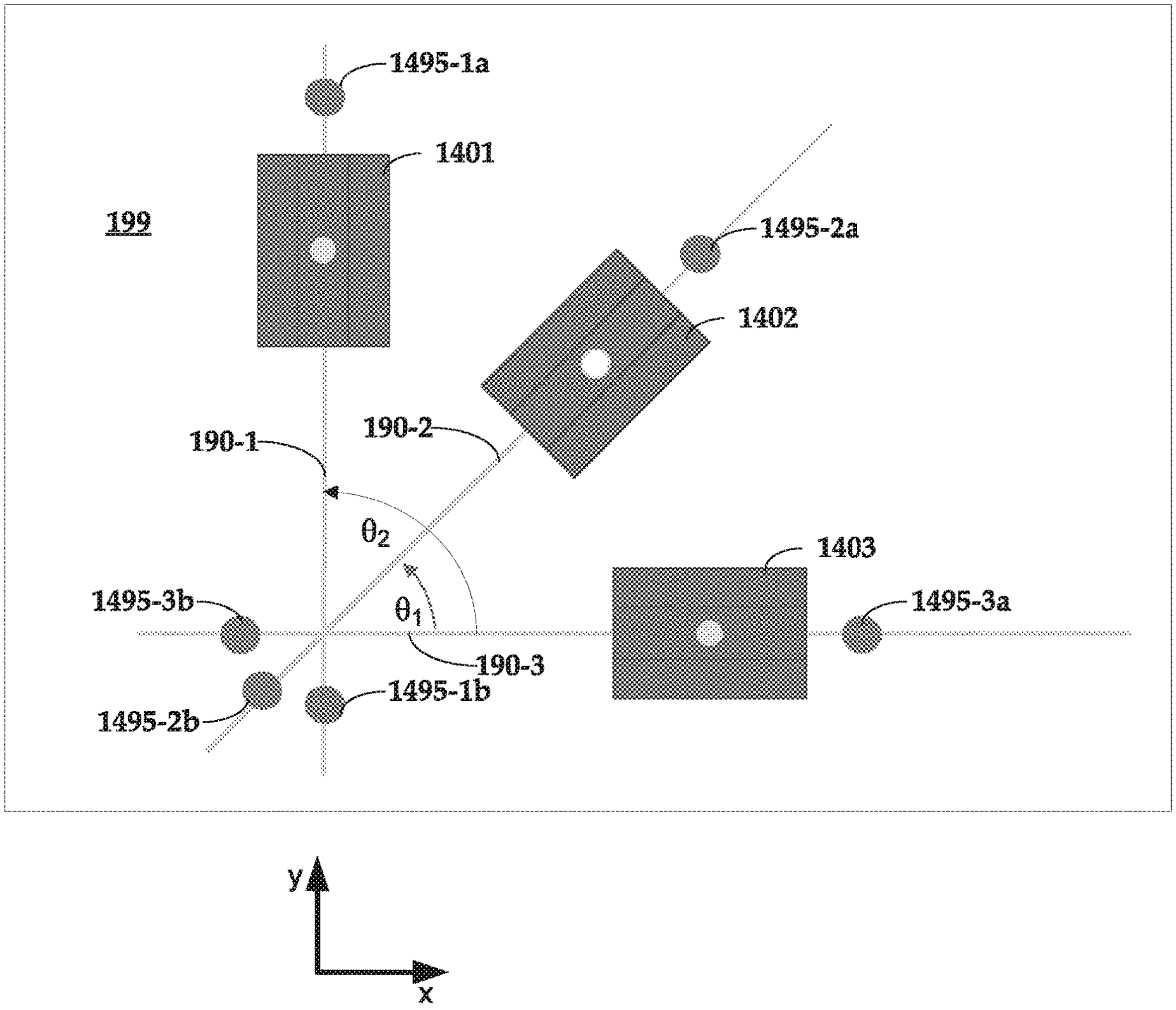
FIG. 14 illustrates a process of attaching mold devices in accordance with some embodiments.

FIG. 14 illustrates a cluster of mold devices 1401, 1402, 1403 holding optical fibers 190-1, 190-2, 190-3 in a rosette pattern. The central axes of optical fiber 190-3 and mold device 1403 are arranged to lie along the x-axis; the central axes of optical fiber 190-1 and mold device 1401 lie along the y-axis which is orthogonal to the x-axis ($\theta_2$=90 degrees); and the central axes of optical fiber 190-2 and mold device 1402 are arranged at an angle, $\theta_1$=45 degrees, with respect to the x-axis. In this embodiment, the optical fibers 190-1, 190-2, 190-3 are secured in the mold cavities of the mold devices 1401, 1402, 1403 by mold material injected through the first hole of each mold device 1401, 1402, 1403. Each of the mold devices 1401, 1402, 1403 are secured to the surface of the structure 199 by adhesive disposed on the top and/or bottom surfaces of the devices 1401, 1402, 1403. The optical fibers 190-1, 190-2, 190-3 are attached by epoxy or other type glue to the structure at two or more attachment points. Optical fiber 190-1 is attached to the surface of at attachments points 1495-1*a*, 1495-1*b*; optical fiber 190-2 is attached at attachments points 1495-2*a*, 1495-2*b*; and optical fiber 190-3 is attached at attachments points 1495-3*a*, 1495-3*b*. The optical fibers 190-1, 190-2, 190-3 may optionally be pre-strained before attachment to the structure 199 at attachment points 1495-1*a*, 1495-1*b*, 1495-2*a*, 1495-2*b*, 1495-3*a*, 1495-3*b*.

Figure 15A:
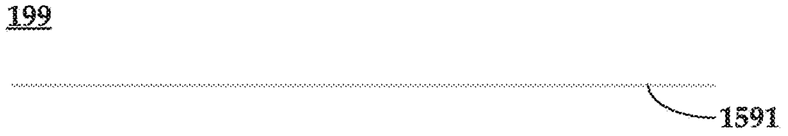
FIG. 15A through 15Q illustrate a process of attaching mold devices to a structure, the mold devices having front and back features used to pre-strain the optical fibers in accordance with some embodiments.
Figure 15B:
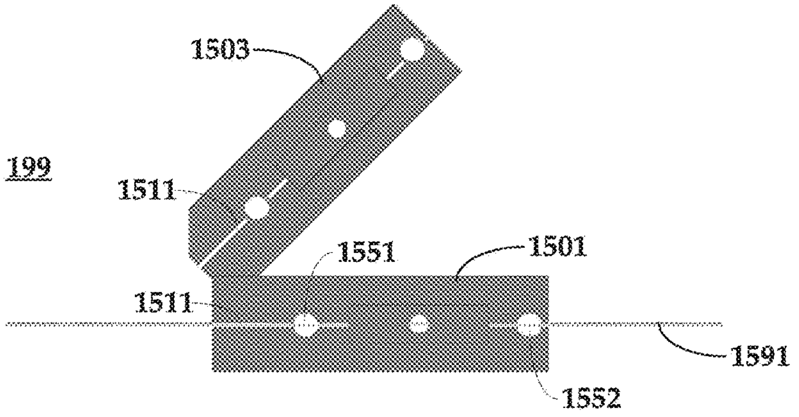
Figure 15C:
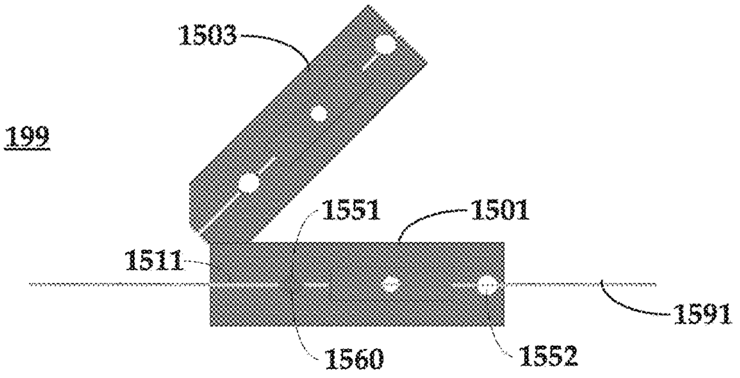
Figure 15D:
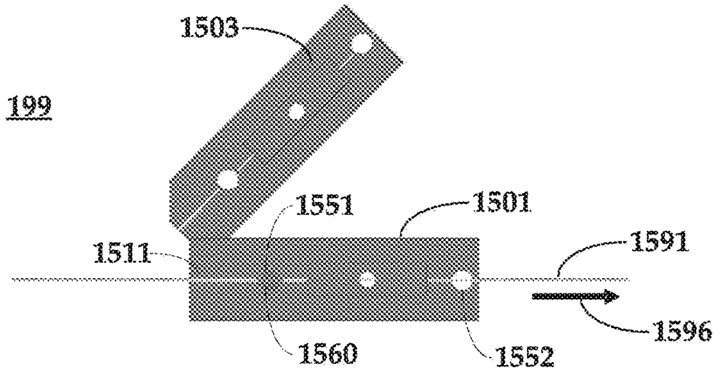
Figure 15E:
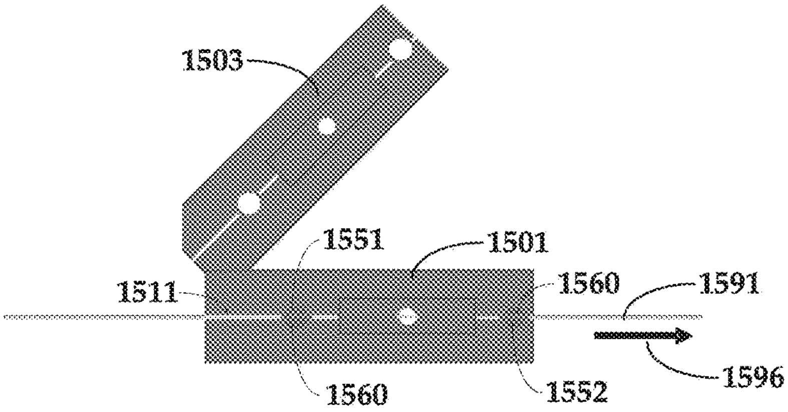
Figure 15F:
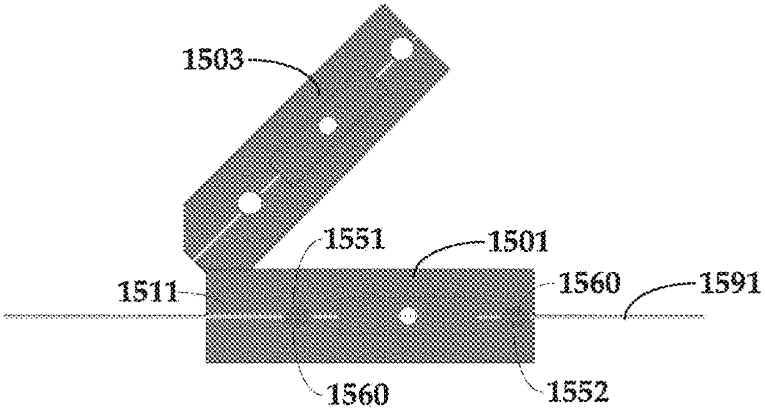
Figure 15G:
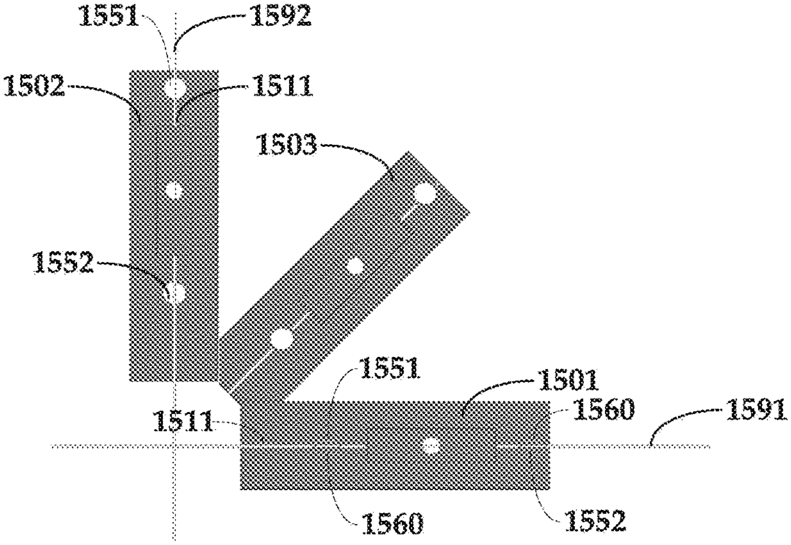
Figure 15H:
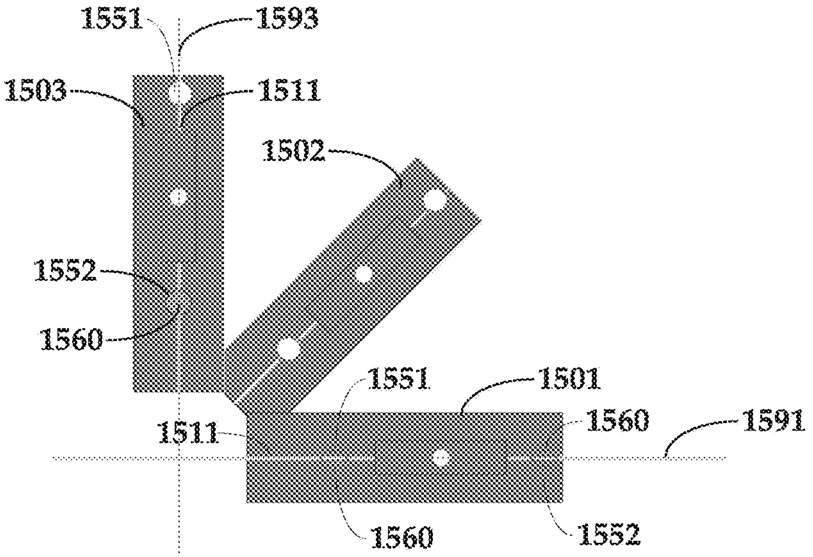
Figure 15I:
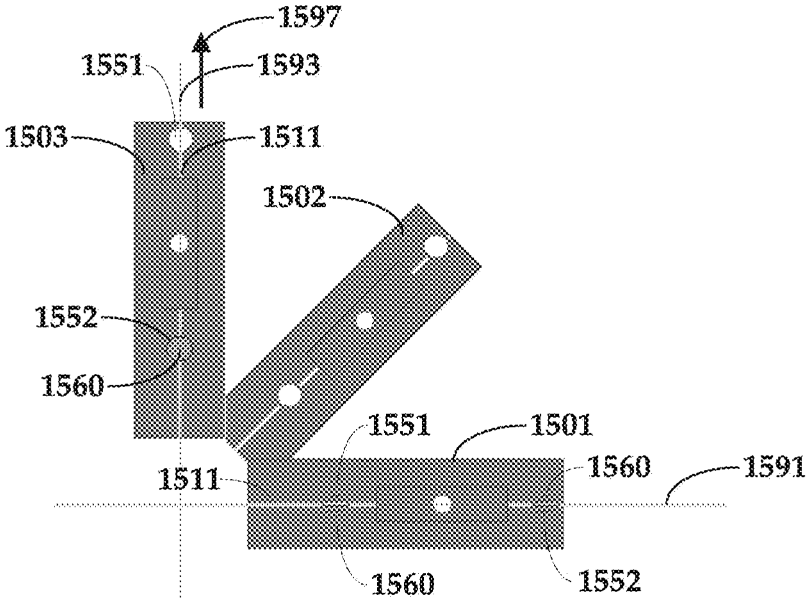
Figure 15J:
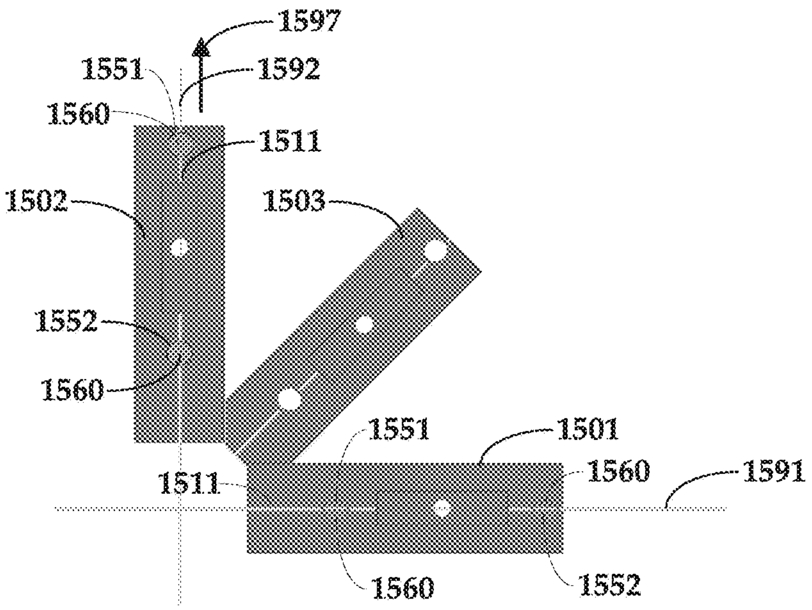
Figure 15K:
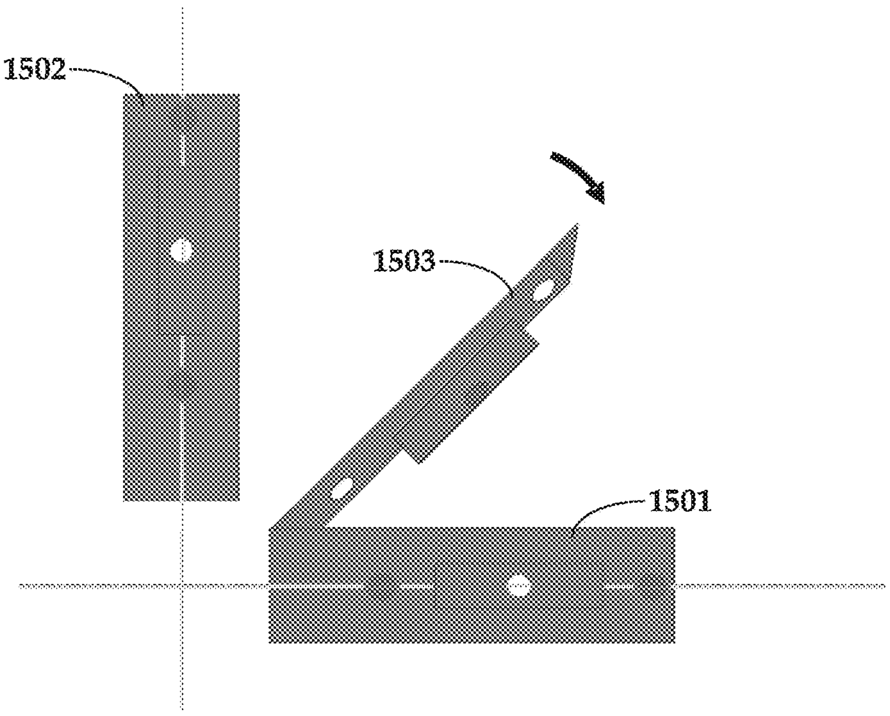
Figure 15L:
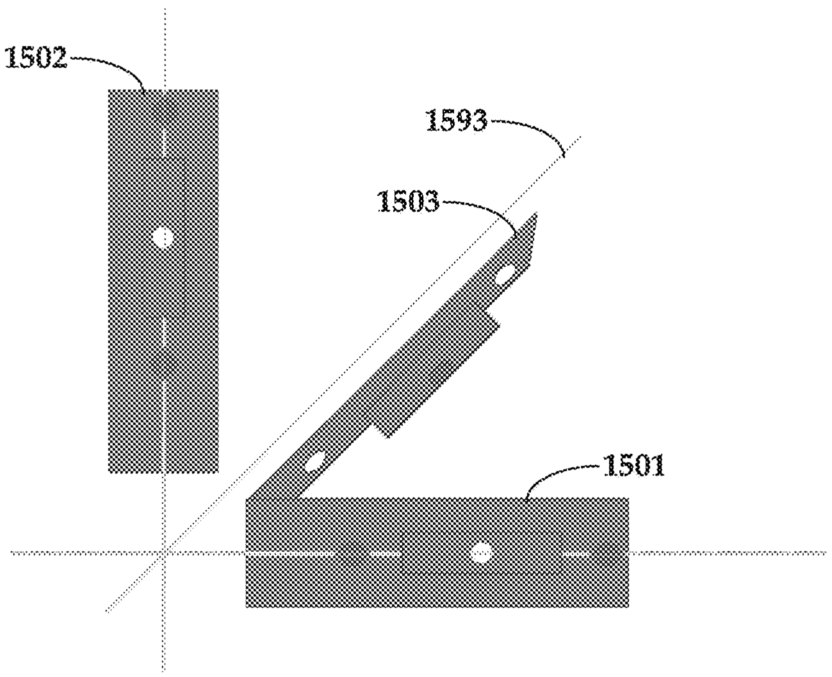
Figure 15M:
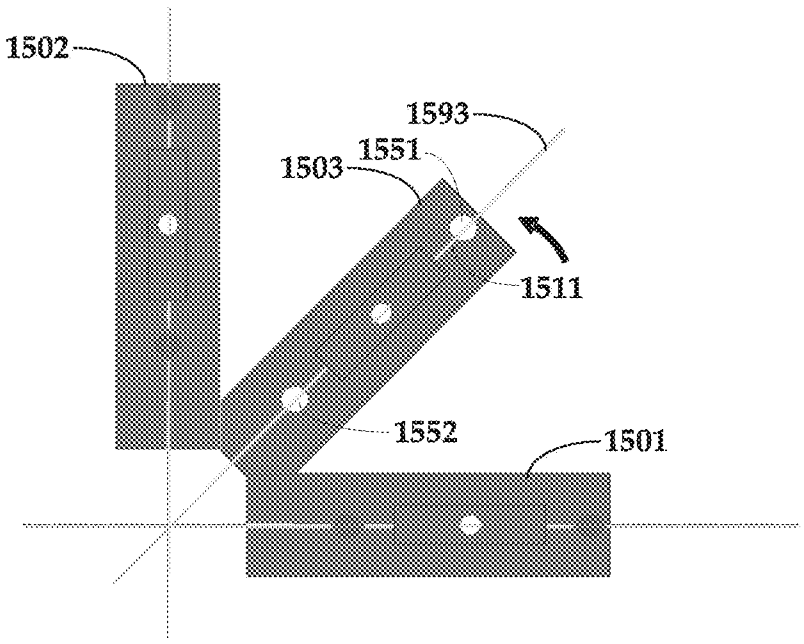
Figure 15N:
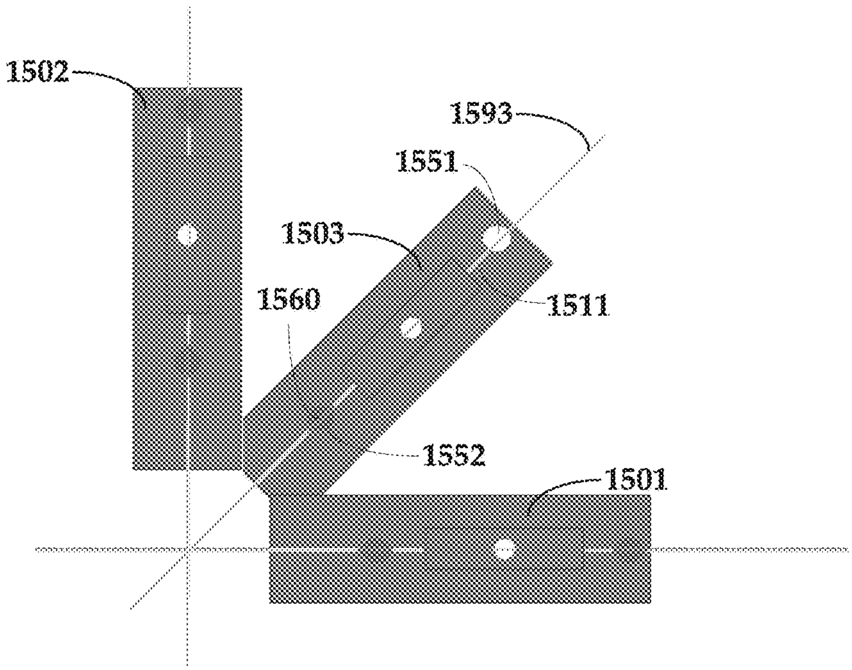
Figure 15O:
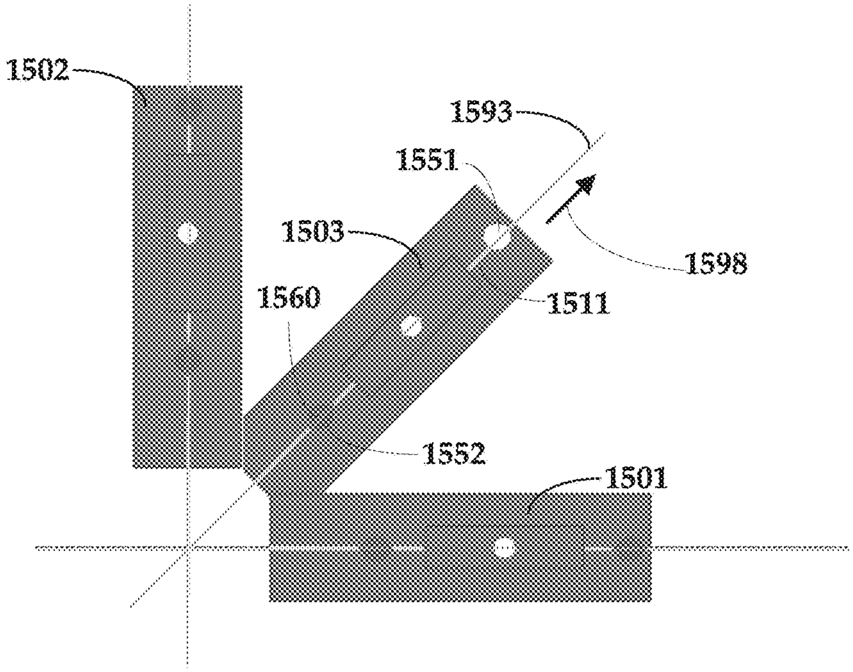
Figure 15P:
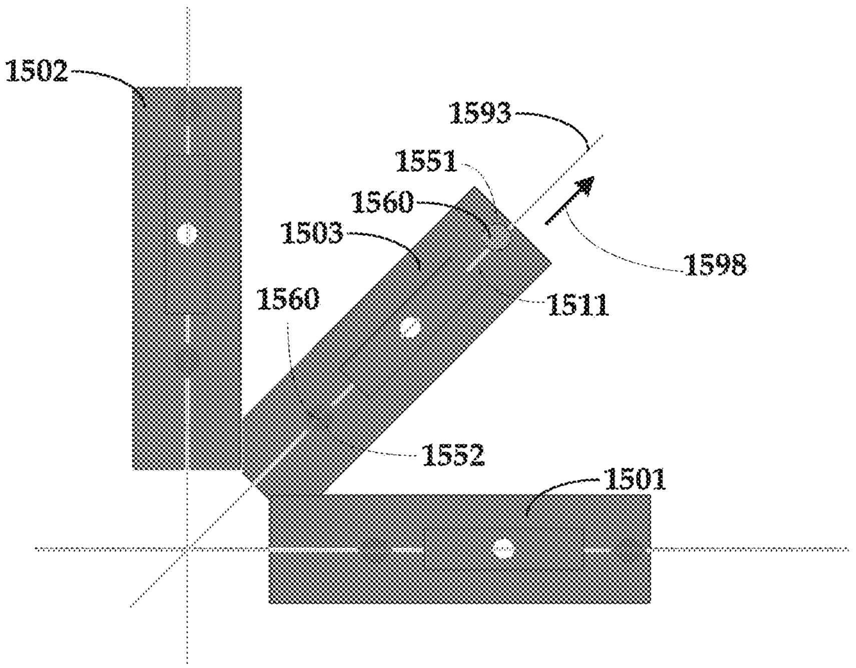
Figure 15Q:
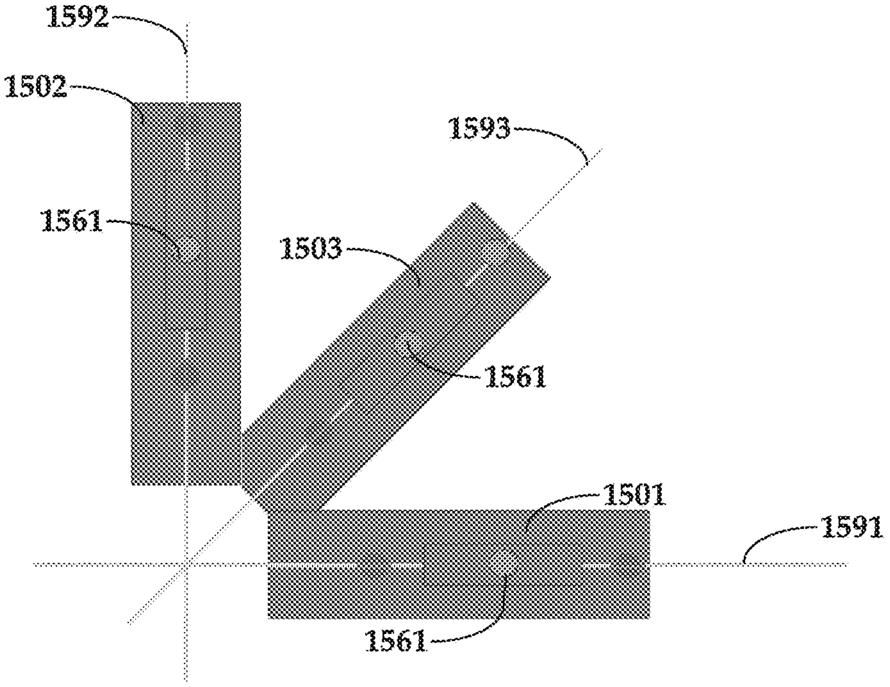

FIGS. 15A through 15Q illustrate a method of attaching optical fibers to a structure in a rosette pattern using mold devices in accordance with some embodiments. Referring now to FIG. 15A, initially, an optical fiber 1591 is positioned on a structure 199. As shown in FIG. 15B, the first mold device is placed over the optical fiber 1591. The longitudinal opening 1511 in the mold device 1501 receives the optical fiber 1591. The first mold device 1501 is positioned so that the optical fiber is exposed by the first hole 1551 in the front extension of the first mold device 1501 and by the second hole 1552 in the back extension of the first mold device 1501. The first mold device 1501 is attached to the surface of the structure 199 by an adhesive disposed on the top and/or bottom surfaces of the mold device 1501. An additional mold device 1503 is positioned on the surface. The sloped corner of the additional mold device 1503 assists in orienting the second mold device 1503 at about a 45 degree angle with respect to the first mold device 1501.

FIG. 15C shows the arrangement after a flowable glue, such as epoxy 1560 has been deposited into the hole 1551 in the front extension of the first mold device 1501 and the epoxy is cured. Note that the epoxy used in hole 1551 need not be the same adhesive as the adhesive used to secure the mold device to the surface of the structure. The epoxy 1560 bonds one end of the optical fiber 1591 to the surface of the structure 199. Tension is applied to the optical fiber 1591 in the direction of arrow 1596 as depicted in FIG. 15D. While the tension is being applied along the direction 1596, epoxy is deposited into the second hole 1552 in the back extension of the first mold device 1501 and the epoxy is cured as shown in FIG. 15E. The cured epoxy in the first and second holes 1551, 1552 maintains the tension in optical fiber 1591 at a predetermined pre-tension value. The tension applied to the optical fiber 1591 along direction 1596 is released as indicated in FIG. 15F.

Referring now to FIG. 15G, in a next process step, optical fiber 1592 is positioned on the structure 199. The second mold device 1502 is placed over the optical fiber 1592. The longitudinal opening 1511 in the mold device 1502 receives the optical fiber 1592. The second mold device 1502 is positioned so that the optical fiber 1592 is exposed by the first and second holes 1551, 1552 in the second mold device 1502. The sloped corner of the third mold device 1503 assists in orienting the second mold device 1502 at about a 45 degree angle with respect to the third mold device 1503.

FIG. 15H shows the arrangement after epoxy 1560 has been deposited into the hole 1551 in the front extension of the second mold device 1502 and the epoxy is cured. The epoxy 1560 bonds one end of the optical fiber 1592 to the surface of the structure 199. Tension is applied to the optical fiber 1592 in the direction of arrow 1597 as depicted in FIG. 15I. While the tension is being applied along the direction 1597, epoxy is deposited into the second hole 1552 in the back extension of the second mold device 1502 and the epoxy is cured as shown in FIG. 15J. The cured epoxy in the first and second hole 1551, 1552 of the second mold device 1502 maintains the tension in optical fiber 1592 at a predetermined pre-tension value. The tension applied to the optical fiber 1592 along direction 1596 is released.

In the next step, the third mold device is rotated (FIG. 15K) out of the plane of the structure surface to allow the third optical fiber 1593 to be positioned on the surface of the structure 199 (FIG. 15L). The third mold device 1503 is then oppositely rotated onto the surface such that the longitudinal opening 1511 in the third mold device 1503 receives the optical fiber 1593 (FIG. 15M). The third mold device 1503 is positioned so that the optical fiber 1593 is exposed by the first and second holes 1551, 1552 in the third mold device 1503.

FIG. 15N shows the arrangement after epoxy 1560 has been deposited into the hole 1551 in the front extension of the third mold device 1503 and the epoxy is cured. The epoxy 1560 bonds one end of the optical fiber 1593 to the surface of the structure 199. Tension is applied to the optical fiber 1593 in the direction of arrow 1598 as depicted in FIG. 15O.

While the tension is being applied along the direction 1598, epoxy is deposited into the second hole 1552 in the back extension of the third mold device 1503 and the epoxy is cured as shown in FIG. 15P. The cured epoxy in the first and second holes 1551, 1552 of the third mold device 1503 maintains the tension in optical fiber 1593 at a predetermined pre-tension value. The tension applied to the optical fiber 1593 along direction 1598 is released. A mold material is injected into the mold cavities of the first, second, and third mold devices 1501, 1502, 1503 through holes 1561. Note that the mold material may be an epoxy and need not be the same material as used to secure the optical fibers 1591, 1592. 1593 and/or to attach the mold devices 1501, 1502, 1503 to the structure 199.

The embodiments previously described are suitable for securing optical fibers that include fiber optic sensors, e.g., fiber Bragg grating (FBG) sensors. FBG sensors can be sensitive to strain in the structure. The approaches discussed herein can facilitate mechanically coupling an FBG sensor to a structure so that strain in the structure is transferred to the sensor.

Conversely, some implementations involve bonding an optical fiber comprising an FBG sensor in such a way that the strain in the structure is not substantially transferred to the sensor. An FBG sensor that is substantially strain-isolated can be used to measure temperature near the structure, for example.

Figure 16:
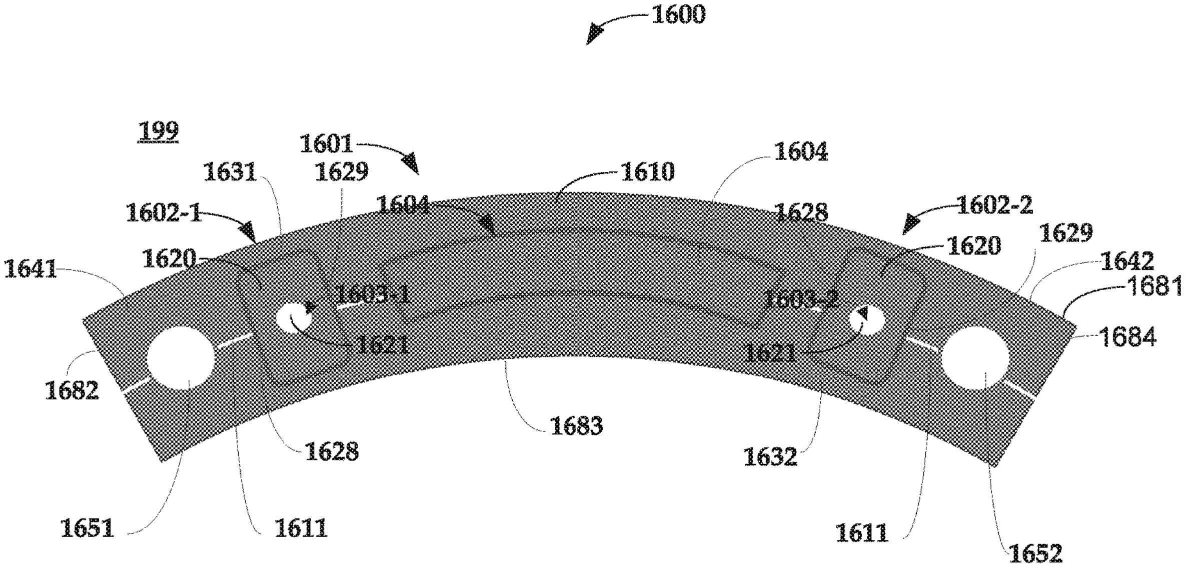
FIG. 16 is a top view of a mold device useful for attaching an optical fiber and/or sensor such that the sensor is substantially strain-isolated from the structure in accordance with some embodiments.

FIG. 16 is a top view of a mold device 1600 suitable for attaching an optical fiber comprising a FBG temperature sensor to a structure such that the temperature sensor is substantially strain-isolated from the structure 199. The mold device 1600 includes a first portion 1601 comprising a base layer 1610 having two curved sides 1681, 1683 and two straight sides 1682, 1684 in this implementation. A longitudinal feature 1611 such as a longitudinal opening or longitudinal groove runs along the base layer 1610.

Two second portions 1602-1, 1602-2 are disposed over the first portion 1601. Each second portion 1602-1, 1601-2 comprises a center wall 1620, a front end wall 1628, and an end wall 1629. The base layer 1610 and the second portion 1602-1 form a first mold cavity 1603-1. The base layer 1610 and the second portion 1602-2 form a second mold cavity 1603-2. First holes 1621 through the center walls 1620 of the second portions 1602-1, 1602-2 are configured to allow mold material to be injected into the mold cavities 1603-1, 1603-2. Second holes (not shown) are disposed in the second portions 1602-1, 1602-2 to allow air displaced by the mold material to exit the mold cavities 1603-1, 1603-2.

A tunnel portion 1604 is disposed between the first and second portions 1602-1, 1602-2. The tunnel portion 1604 is configured to receive and at least partially enclose a fiber optic sensor so that the sensor is substantially mechanically isolated from strain in the tunnel portion 1604. In some embodiments, the tunnel portion 1604 does not include a hole for mold injections and/or air exit. The relatively small defined tunnel portion 1604 housing the optical fiber temperature sensor serves to reduce the temperature sensor exposure to pre-strain and reduces the likelihood that the temperature sensor is accidentally "bonded" to the structure by stain, coatings, paint, etc.

The base layer 1610 includes side extensions 1631, 1632 that extend away from the center walls 1620 of the second portions 1602-1, 1602-2. A front extension 1641 extends away from the front wall 1628 of the first portion 1602-1. A hole 1651 configured to receive epoxy is located in the front extension 1641. A back extension 1642 extends away from the back wall 1629 of the second portion 1602-2. A hole 1652 configured to receive epoxy is located in the back extension 1642.

The base layer 1610 has a first major surface proximate the second portions 1602-1, 1602-2 inside the mold cavity 1603-1, 1603-2 and an opposing second major surface. Side extensions 1631, 1632 have first major surfaces proximate the second portions 1602-1, 1602-2 and opposing second surfaces 1631*b*, 1632*b*. Front and back extensions 1641, 1642 have first major surfaces proximate the second portions 1602-1, 1602-2 and opposing second surfaces. As previously discussed, adhesive may be disposed on one or more of the surfaces to adhesively bond the mold device 1600 to the structure surface as previously discussed.

Figure 17A:
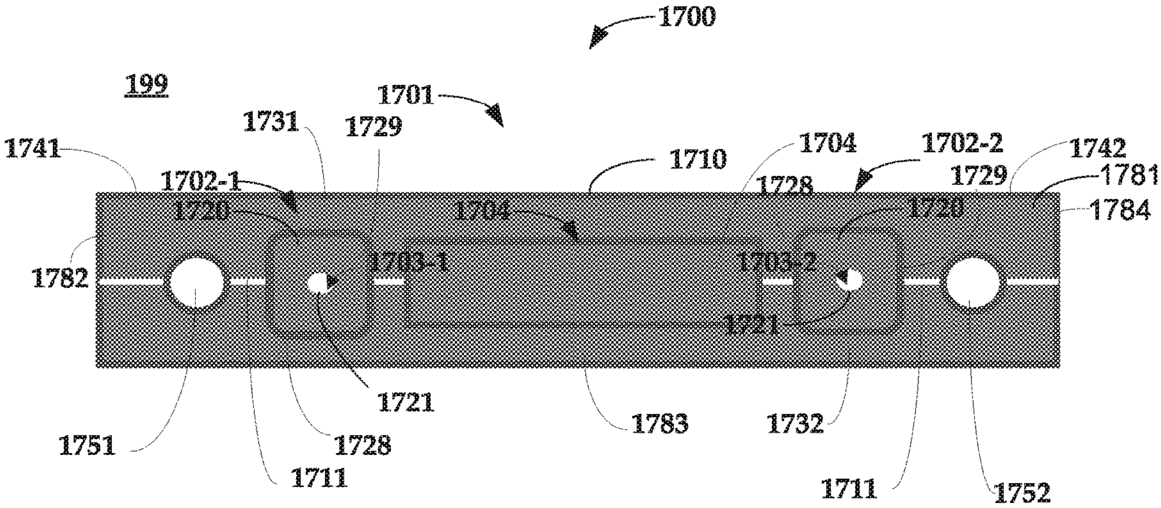
FIGS. 17A and 17B show views of a mold device suitable for attaching an optical fiber comprising a strain free temperature sensor and/or a span sensor in accordance with some embodiments.
Figure 17B:
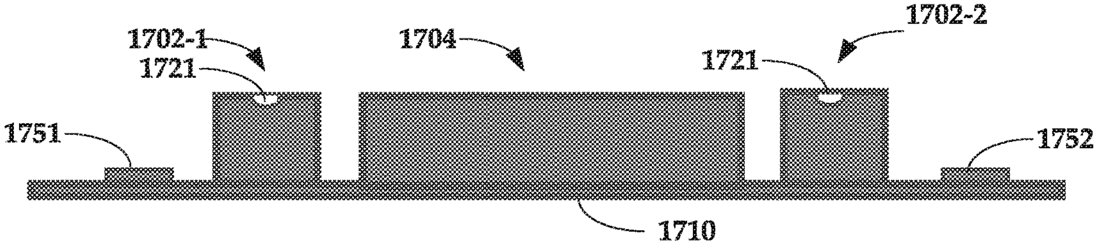

FIG. 17A is a top view and FIG. 17B is a side view of another mold device 1700 suitable for attaching an optical fiber comprising a strain free temperature sensor and/or a span sensor. In this example, the sensor may not be directly attached to structures, but is disposed and protected in the enclosed mold structure. In some cases, two corners of the sensor is attached to the mold instead of directly attached to the structure.

The mold device 1700 includes a first portion 1701 comprising a base layer 1710 having a first two opposing substantially straight sides 1781, 1783 and a second two opposing substantially straight sides 1782, 1784. A longitudinal feature 1711 such as a longitudinal opening or longitudinal groove runs along the base layer 1710.

Two second portions 1702-1, 1702-2 are disposed over the first portion 1701. Each second portion 1702-1, 1701-2 comprises a center wall 1720, a front end wall 1728, and an end wall 1729. The base layer 1710 and the second portion 1702-1 form a first mold cavity 1703-1. The base layer 1710 and the second portion 1702-2 form a second mold cavity 1703-2. First holes 1721 through the center walls 1720 of the second portions 1702-1, 1702-2 are configured to allow mold material to be injected into the mold cavities 1703-1, 1703-2. Second holes (not shown) are disposed in the second portions 1702-1, 1702-2 to allow air displaced by the mold material to exit the mold cavities 1703-1, 1703-2.

A tunnel portion 1704 is disposed between the first and second portions 1702-1, 1702-2. The tunnel portion 1704 is configured to receive and at least partially enclose a fiber optic sensor so that the sensor is substantially protected from environmental perturbation (e.g., wind, rain, etc.) in the tunnel portion 1704. According to various configurations, the temperature sensor is substantially mechanically isolated from strain in the tunnel portion 1704, and the span sensor is pre-strained in the tunnel portion 1704. In some embodiments, the tunnel portion 1704 does not include a hole for mold injections and/or air exit. The relatively small defined tunnel portion 1704 housing the optical fiber temperature sensor serves to reduce the temperature sensor exposure to pre-strain and reduces the likelihood that the temperature sensor and/or span sensor is accidentally "bonded" to the structure by stain, coatings, paint, etc.

The base layer 1710 includes side extensions 1731, 1732 that extend away from the center walls 1720 of the second portions 1702-1, 1702-2. A front extension 1741 extends away from the front wall 1728 of the first portion 1702-1. A hole 1751 configured to receive epoxy is located in the front extension 1741. A back extension 1742 extends away from the back wall 1729 of the second portion 1702-2. A hole 1752 configured to receive epoxy is located in the back extension 1742.

The base layer 1710 has a first major surface proximate the second portions 1702-1, 1702-2 inside the mold cavity 1703-1, 1703-2 and an opposing second major surface. Side extensions 1731, 1732 have first major surfaces proximate the second portions 1702-1, 1702-2 and opposing second surfaces. Front and back extensions 1741, 1742 have first major surfaces proximate the second portions 1702-1, 1702-2 and opposing second surfaces. As previously discussed, adhesive may be disposed on one or more of the surfaces to adhesively bond the mold device 1700 to the structure surface as previously discussed.

The mold devices described herein facilitate defining the shape, size, location, and/or amount of adhesive used for the bond between the mold device and the structure. The disclosed approaches for using the mold device enable a defined and homogeneous strain transfer (within one sensor or between different sensors), e.g., by reducing bubbles and/or voids in the mold material. The mold device enables controlled bonding which can be implemented into automated, semi-automated, and/or manual fiber sensor installation using robots and/or installation tools. When installed as discussed herein, the mold device protects the optical fiber and/or fiber sensor from environmental impacts such as water ingress, UV exposure, chemical impact such as car exhaust, humidity, vibration, etc.

In some embodiments, the type of adhesive and/or mold material used with the mold device may be configured to indicate that bonding occurs and/or was performed correctly. For example, with reference to FIG. 8B, a first type adhesive may be used to bond the mold device 800 to the structure surface, a second type of adhesive may be used in features 851, 852, and a third type of adhesive may be injected into hole 521 as the mold material. In some embodiments, different types of adhesive may change color when deposited as an indicator to facilitate installation. Adhesive materials used at different locations may be different types. For example, adhesive used to bond the mold device to the structure may be a fast curing adhesive. The adhesive deposited in features 851, 852 and/or 521 may be a slower curing adhesive, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method, comprising:

positioning an optical fiber in a longitudinal feature of a planar base layer of a mold device, the mold device comprising:

a first portion comprising the planar base layer having the longitudinal feature along a plane of the planar base layer, the longitudinal feature configured to receive the optical fiber, the planar base layer comprising peripheral planar portions adjacent to the longitudinal feature; and a second portion disposed over the peripheral planar portion, the second portion comprising:

a center wall; and front and back end walls, the center wall, the front end wall, and the back end wall forming a mold cavity;

at least one first hole in the mold cavity configured to allow mold material to enter the mold cavity; and at least one second hole in the mold cavity configured to allow air displaced by the mold material to exit the mold cavity;

placing the mold device and the optical fiber on a structure surface; and injecting the mold material into the first hole of the mold device.

2. The method of claim 1, further comprising adhesively attaching the mold device to the structure surface.

3. The method of claim 1, wherein:

the base layer comprises first and second side extensions that extend in opposite directions away from the center wall; and the method further comprises adhesively attaching the mold device to the structure surface at the first and second side extensions.

4. The method of claim 1, further comprising pre-straining the optical fiber before injecting the mold material.

5. The method of claim 1, wherein the base layer further comprises;

a front extension adjacent the front end wall and extending away from the front end wall;

a back extension adjacent the back end wall and extending away from the back end wall, the longitudinal feature continuing longitudinally through the front extension and the back extension;

a front feature in the front extension aligned with a longitudinal opening and extending through opposing major surfaces of the front extension;

a back feature in the back extension aligned with the longitudinal opening and extending through opposing major surfaces of the back extension; and wherein the method further comprises applying glue into the first hole and the second hole and in contact with the optical fiber.

6. The method of claim 5, wherein applying the glue into the front feature and the back feature and in contact with the optical fiber comprises:

applying the glue into the back feature;

pre-straining the optical fiber after applying the glue into the back feature; and applying the glue into the front feature after pre-straining the optical fiber, wherein after curing, the glue in the front feature and the back feature is configured to hold the optical fiber at a predetermined pre-strain value.

7. The method of claim 1, wherein the longitudinal feature comprises a longitudinal opening.

8. The method of claim 1, wherein the longitudinal feature comprises a longitudinal groove.

9. The method of claim 1, wherein the base layer comprises first and second side extensions that extend in opposite directions away from the center wall.

10. The method of claim 9, wherein an adhesive is disposed on a surface of one or both of the first and second side extensions.

11. The method of claim 1, further comprising a partial base layer, wherein the front and back end walls, the center wall, the front end wall, the back end wall and the partial base layer form the mold cavity.

12. The method of claim 1, further comprising:

a front feature in a front extension aligned with the longitudinal feature and configured to receive adhesive that secures the optical fiber; and a back feature in the back extension aligned with the longitudinal feature and configured to receive adhesive to secure the optical fiber.

13. The method of claim 12, wherein one or both of the front and back features comprises a hole through the base layer.

14. The method of claim 12, wherein one or both of the front and back features comprises a well.

15. The method of claim 1, wherein the well has a lip that extends above the base layer.

16. The method of claim 1, further comprising engagement features disposed on one or more of edges of the base layer, each of the engagement features configured to engage a compatible engagement feature of another optical fiber mold device.

* * * * *